US012782161B2

(12) United States Patent
Tymofieiev et al.

(10) Patent No.: US 12,782,161 B2
(45) Date of Patent: Nov. 3, 2026

(54) AUTOMATIC GENERATING OF BLOCKAGES IN MAP INFORMATION FOR USE BY A FLEET OF AUTONOMOUS VEHICLES

(71) Applicant: Waymo LLC, Mountain View, CA (US)

(72) Inventors: Dmytro Tymofieiev, Sunnyvale, CA (US); Chenyue Cook, San Francisco, CA (US); Joshua Jacob, San Francisco, CA (US); Zekai Li, Belmont, CA (US)

(73) Assignee: Waymo LLC, Mountain View, CA (US)

( * ) Notice: Subject to any disclaimer, the term of this patent is extended or adjusted under 35 U.S.C. 154(b) by 317 days.

(21) Appl. No.: 18/120,138

(22) Filed: Mar. 10, 2023

(65) Prior Publication Data

US 2024/0302184 A1 Sep. 12, 2024

(51) Int. Cl.
*G01C 21/00* (2006.01)

(52) U.S. Cl.
CPC ..... *G01C 21/3889* (2020.08); *G01C 21/3807* (2020.08); *G01C 21/3841* (2020.08)

(58) Field of Classification Search
CPC ........... G01C 21/3889; G01C 21/3807; G01C 21/3841
USPC ... 701/532, 409, 450, 25, 461, 410, 23, 446, 701/411, 117, 423, 400, 26, 408, 420, 701/412, 468, 445, 454, 455, 414, 29.3
See application file for complete search history.

(56) References Cited

U.S. PATENT DOCUMENTS

| | | | | |
|---|---|---|---|---|
| 10,916,142 | B2 | 2/2021 | Fairfield et al. | |
| 10,955,851 | B2 | 3/2021 | Ghafarianzadeh et al. | |
| 11,966,230 | B1 * | 4/2024 | Woelki | B60W 60/0027 |
| 2011/0060496 | A1 * | 3/2011 | Nielsen | G06Q 10/0631 701/1 |
| 2020/0363223 | A1 * | 11/2020 | Abrams | G01C 21/3438 |
| 2021/0004363 | A1 | 1/2021 | Bailly et al. | |
| 2022/0063639 | A1 * | 3/2022 | Stenneth | B60W 40/06 |
| 2022/0063653 | A1 * | 3/2022 | Beaurepaire | G01C 21/3453 |
| 2022/0063661 | A1 * | 3/2022 | Passa | H04W 4/44 |
| 2023/0030815 | A1 * | 2/2023 | Happold | B60W 50/023 |
| 2023/0067887 | A1 * | 3/2023 | Garg | B60W 30/18163 |

(Continued)

OTHER PUBLICATIONS

"Cluster Analysis", Wikipedia, retrieved on Jan. 25, 2023, url: https://en.wikipedia.org/wiki/Cluster_analysis.

(Continued)

*Primary Examiner* — Anne Marie Antonucci
*Assistant Examiner* — Jodi Jones
(74) *Attorney, Agent, or Firm* — Botos Churchill IP Law

(57) ABSTRACT

Aspects of the disclosure provide methods of generating blockages in map information for use by a fleet of autonomous vehicles. For instance, information from an autonomous vehicle of the fleet may be received by one or more processors of a server computing system. That the received information meets at least one set of rules for generating blockages may be determined. Based on the determination that the received information meets at least one set of rules for generating blockages, blockage data identifying a specific area of a blockage may be generated. The blockage data may be sent to the autonomous vehicles of the fleet in order to enable the autonomous vehicles of the fleet to avoid the specific area of the blockage.

14 Claims, 19 Drawing Sheets

100

(56) References Cited

U.S. PATENT DOCUMENTS

| | | | | |
|---|---|---|---|---|
| 2023/0368673 | A1* | 11/2023 | Rusciano | G08G 1/0137 |
| 2024/0149916 | A1* | 5/2024 | Kote | G08G 1/205 |

OTHER PUBLICATIONS

"Local Outlier Factor", Wikipedia, retrieved Feb. 28, 2023, url: https://en.wikipedia.org/wiki/Local_outlier_factor.
"OPTICS Algorithm", Wikipedia, retrieved Jan. 25, 2023, url: https://en.m.wikipedia.org/wiki/OPTICS_algorithm.
"Standard Score", Wikipedia, retrieved Feb. 28, 2023, url: https://en.wikipedia.org/wiki/Standard_score.

* cited by examiner

100

200

200

400

400

600

600

Cul-De-Sac Example

600

200

200

200

200

1700

AUTOMATIC GENERATING OF BLOCKAGES IN MAP INFORMATION FOR USE BY A FLEET OF AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings. This data may be combined with pre-stored map information in order to enable the autonomous vehicle to plan trajectories in order to maneuver itself through the surroundings.

BRIEF SUMMARY

One aspect of the disclosure provides a method of generating blockages in map information for use by a fleet of autonomous vehicles. The method includes receiving, by one or more processors of a server computing system, information from an autonomous vehicle; determining, by the one or more processors, that the received information meets at least one set of rules for generating blockages, wherein the at least one set of rules specifies whether a specific geographic area has a minimum number of disengagement or stranding instances associated with the fleet; based on the determination that the received information meets the at least one set of rules for generating blockages, generating, by the one or more processors, blockage data identifying a specific area of a blockage; and sending, by the one or more processors, the blockage data to autonomous vehicles of the fleet in order to enable the autonomous vehicles of the fleet to avoid the specific area of the blockage.

In one example, the received information includes stranding information indicating a stranding instance associated with the autonomous vehicle. In another example, the received information includes disengagement information indicative of a disengagement instance associated with the autonomous vehicle has become stranded. In another example, the at least one set of rules for generating blockages is associated with a minimum number of autonomous vehicles reporting information that satisfies the at least one set of rules for generating blockages. In this example, the at least one set of rules for generating blockages is associated with a timing constraint for meeting the set of rules. In another example, the method also includes receiving, by the one or more processors, updated information from a second autonomous vehicle; determining, by the one or more processors, based on the updated information that a second set of rules for removing the blockage has been met by a minimum number of autonomous vehicles; and based on the determination that the second set of rules has been met, sending a second instruction to the autonomous vehicles of the fleet to remove the blockage from map information stored locally at the autonomous vehicles of the fleet. In this example, the second set of rules is associated with a timing constraint for meeting the second set of rules. In another example, the method also includes receiving, by the one or more processors, second information from a second autonomous vehicle; determining, by the one or more processors, that the received information does not meet any of the set of rules for generating blockages; determining, by the one or more processors, that a second blockage is needed based on the second information and an increase in a number of disengagement or stranding instances associated with the fleet; in response to determining that a second blockage is needed, generating, by the one or more processors, second blockage data identifying a second specific area of the second blockage; and sending, by the one or more processors, the second blockage data to the autonomous vehicles of the fleet in order to enable the autonomous vehicles of the fleet to avoid the second specific area of the second blockage. In this example, the method also includes determining the increase based on a probabilistic approach.

Another aspect of the disclosure provides a method of generating blockages in map information for use by a fleet of autonomous vehicles. The method includes receiving, by one or more processors of a server computing system, information from an autonomous vehicle; determining, by the one or more processors, that the received information meets at least one set of rules for generating blockages, wherein at least one of the sets of rules specifies whether a specific geographic area has been traversed by a minimum number of autonomous vehicles; based on the determination that the received information meets at least one set of rules for generating blockages, generating, by the one or more processors, a blockage data identifying a specific area of a blockage; and sending, by the one or more processors, the blockage data to autonomous vehicles of the fleet in order to enable the autonomous vehicles of the fleet to avoid the specific area of the blockage.

In one example, the specific geographic area is a cul-de-sac. In another example, the at least one set of rules for generating blockages is associated with a minimum number of autonomous vehicles reporting information that satisfies the at least one set of rules for generating blockages. In this example, the at least one set of rules for generating blockages is associated with a timing constraint for meeting the set of rules. In another example, the method also includes receiving, by the one or more processors, updated information from a second autonomous vehicle of the fleet; determining, by the one or more processors, based on the updated information that a second set of rules for removing the blockage has been met by a minimum number of autonomous vehicles; and based on the determination that the second set of rules has been met, sending a second instruction to the autonomous vehicles of the fleet to remove the blockage from map information stored locally at the autonomous vehicles of the fleet. In this example, the second set of rules is associated with a timing constraint for meeting the second set of rules.

Another aspect of the disclosure provides a method of generating blockages in map information for use by a fleet of autonomous vehicles. The method includes receiving, by one or more processors of a server computing system, information from an autonomous vehicle; determining, by the one or more processors, that the received information meets at least one set of rules for generating blockages, wherein at least one of the sets of rules specifies whether autonomous vehicle has reported an error situation or fallback state for the autonomous vehicle; based on the determination that the received information meets at least one set of rules for generating blockages, generating, by the one or more processors, a blockage data identifying a specific area of a blockage; and sending, by the one or more processors, the blockage data to autonomous vehicles of the fleet in order to enable the autonomous vehicles of the fleet to avoid the specific area of the blockage.

In one example, the at least one set of rules for generating blockages is associated with a minimum number of autonomous vehicles reporting information that satisfies the at least one set of rules for generating blockages. In another example, the at least one set of rules for generating blockages is associated with a timing constraint for meeting the at least one set of rules. In another example, the method also includes receiving, by the one or more processors, updated information from a second autonomous vehicle of the fleet; determining, by the one or more processors, based on the second information that a second set of rules for removing the blockage has been met by a minimum number of autonomous vehicles; and based on the determination that the second set of rules has been met, sending a second instruction to the autonomous vehicles of the fleet to remove the blockage from map information stored locally at the autonomous vehicles of the fleet. In this example, the second set of rules is associated with a timing constraint for meeting the second set of rules.

DETAILED DESCRIPTION

Overview

Figure 1:
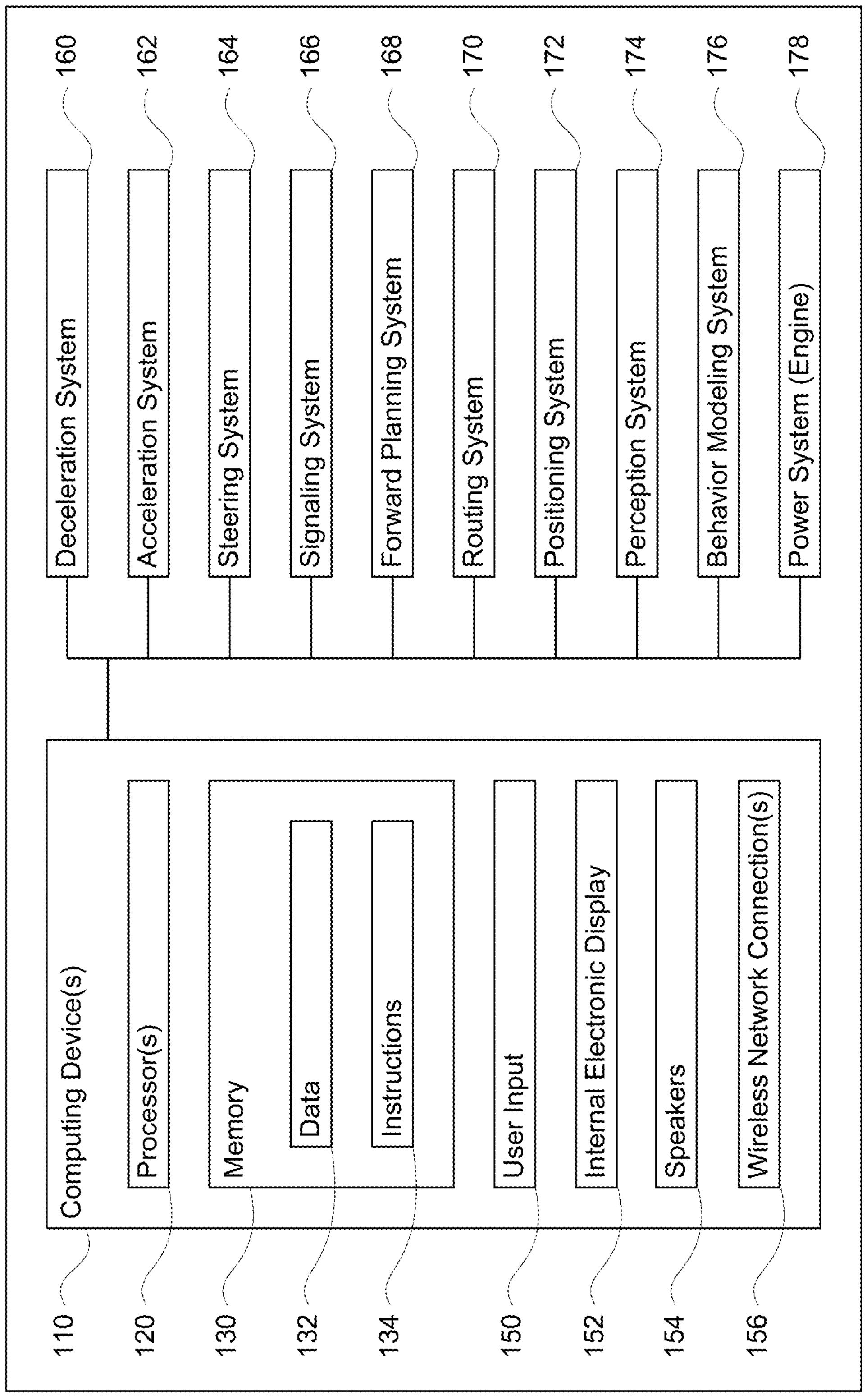
FIG. 1 is a functional diagram of an example vehicle in accordance with an exemplary embodiment.

The technology relates to automatically generating blockages for map information for use by a fleet of autonomous vehicles. For example, as these autonomous vehicles drive around, respective perception systems detect and identify objects. Certain information about the status of the autonomous vehicles as well as information about detected objects or agents is reported to a fleet management system. The reported information may be leveraged in order to determine when it may be appropriate to create a blockage in map information used by the autonomous vehicles to navigate. As such, a blockage may include an area of map information that the system marks for an autonomous vehicle to avoid. Blockage data or information identifying these blockages may then be provided to all or some or the autonomous vehicles of the fleet in order to enable them to update their respective map information and thereby prevent the autonomous vehicles from driving within areas of these blockages.

As noted above, as an autonomous vehicle of a fleet drives around, the autonomous vehicle's perception system may detect and identify objects in the vehicle's environment. For example, the perceptions system of the autonomous vehicle may use sensors to detect and identify road users (e.g., pedestrians, bicyclists, vehicles, etc.), fences, construction objects (e.g., cones, fences, barriers), signs (e.g., temporary or persistent stop signs, speed limit signs, etc.), etc. In some instances, certain detectors may be used to identify the location and bounds of certain types of areas which may or may not already be incorporated into the map information such as a school zone, construction zones, etc.

Certain of this information generated by the perception system as well as other information about the status of the autonomous vehicle may be sent to a fleet management system. For example, the other information may include the pose, speed, and other characteristics. This information may be sent via a network. In this regard, the fleet management system may receive the information from the plurality of vehicles as a stream of coordinates for respective perception objects.

The received information may be compared by the fleet management system to at least one set of rules for generating different types of blockages. Each set of rules may be associated with, for example, a minimum number of autonomous vehicles reporting information that meets the rules of the set of rules. In some instances, sets of rules may be associated with a timing constraint for meeting the set of rules. In addition, each set of rules may be associated with blockage generation instructions and a blockage time as discussed further below.

For example, one set of rules may correspond to construction zone blockages. As another example, one set of rules may correspond to potential construction blockages. As another example, one set of rules may correspond to cul-de-sac blockages. As another example, one set of rules may correspond to stranding or disengage blockages. As another example, one set of rules may correspond to volume blockages. As another example, one set of rules may correspond to fallback blockages.

If any of the sets of rules are met by the received information, the fleet management system may generate blockage data for a blockage for a particular area. Depending upon which set of rules is met, the fleet management system may generate the blockage in different ways. In this regard as noted above, each set of rules may be associated with blockage generation instructions for generating blockage data for a blockage including a particular area. This particular area may be as granular as a specific section of a lane, sections of a plurality of lanes, an intersection, or even larger areas.

Once blockage data for a blockage is generated, the fleet management system may broadcast blockage data identifying the specific area of the blockage to the autonomous vehicles of the fleet. For instance, the fleet management system needs only identify edges of the road graph which are associated with some change. This may provide an efficient and reliable way to update the map information stored locally at each autonomous vehicle of the fleet in real time.

Each autonomous vehicle may receive the information and incorporate it into that autonomous vehicle's local version of the map information. In this regard, the autonomous vehicles may be automatically able to avoid the specific areas associated with the blockages.

As noted above, each set of rules may also be associated with a blockage time. This blockage time may define how long a particular blockage is to persist in an autonomous vehicle's local map information. In this regard, the fleet management system may provide a blockage time with each new blockage. In some instances, the fleet management system may provide an update to the fleet to remove blockage data for a blockage once certain conditions for the blockage have been met. In some instances, the updates may be based on the aforementioned information received from the autonomous vehicles of the fleet.

The features described herein may provide a centralized system that is able to control where autonomous vehicles of a fleet are able to drive in real time. For example, the features may allow for a fleet management system to automatically and without human intervention prevent autonomous vehicles of a fleet from driving in certain areas without the need for humans to first confirm the blockage or to notify specific vehicles. In other words, the approaches described herein may improve the overall quality of driving for a fleet of autonomous vehicles without necessarily requiring any specific, centralized decision-making. By generating blockage and implementing blockages automatically, autonomous vehicles of the fleet can immediately start avoiding particular lanes and there is no need to do any intelligence gathering before implementing a blockage. Moreover, the features described herein provide for a system where the map information at each autonomous vehicle is as consistent as possible across the fleet. In many instances, adding blockages to the map information used by the autonomous vehicle may reduce the numbers of strandings and disengagements, reduce traffic congestion caused by slow moving or stopped (e.g., stranded) autonomous vehicles through certain areas, and may also improve navigation quality. As such, the features described herein may also improve the experience of passengers of these autonomous vehicles. Moreover, the more autonomous vehicles providing information, the more useful and up to date the blockages may be.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2A:
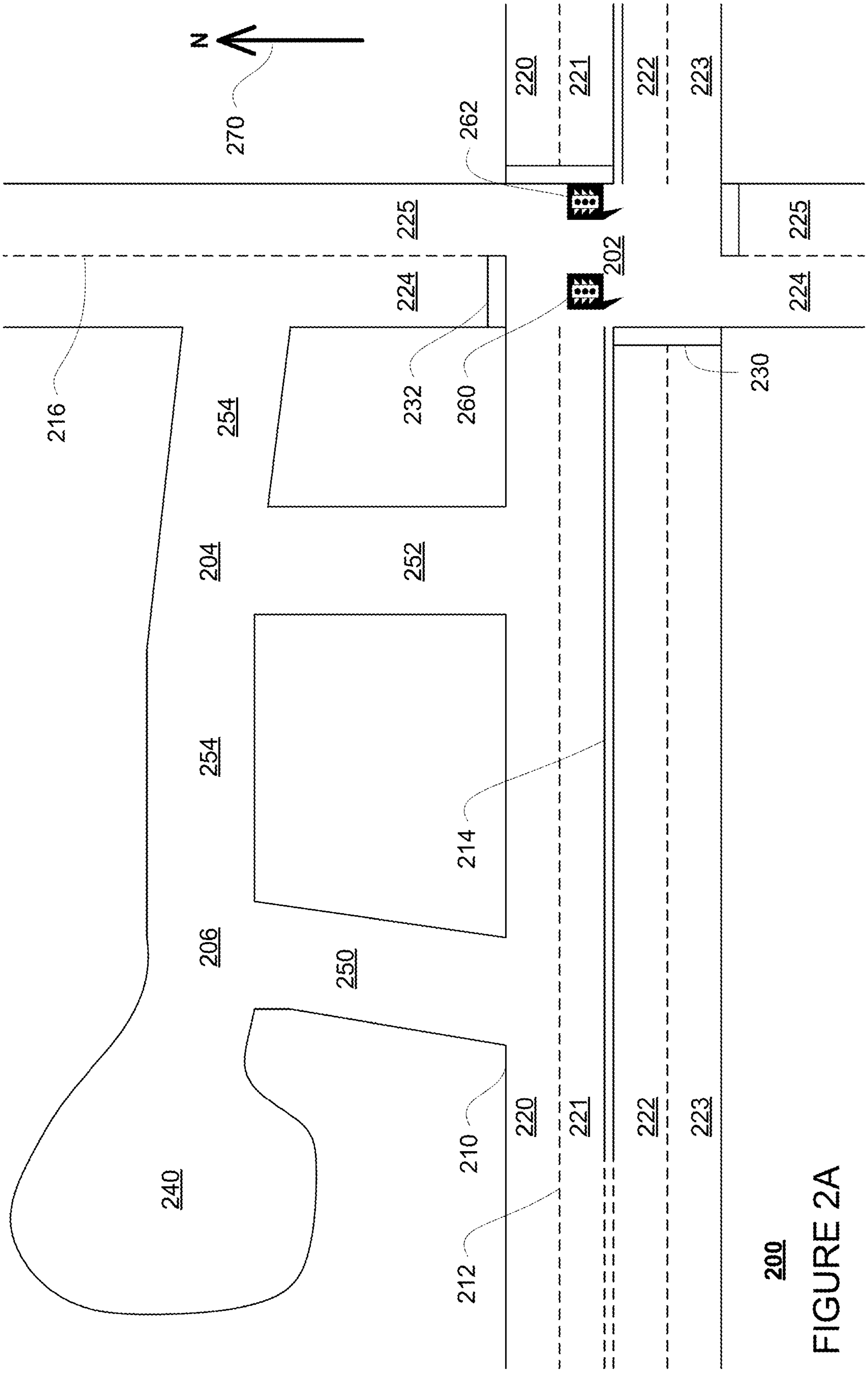
FIG. 2A-2B is an example of map information in accordance with aspects of the disclosure.
Figure 2B:
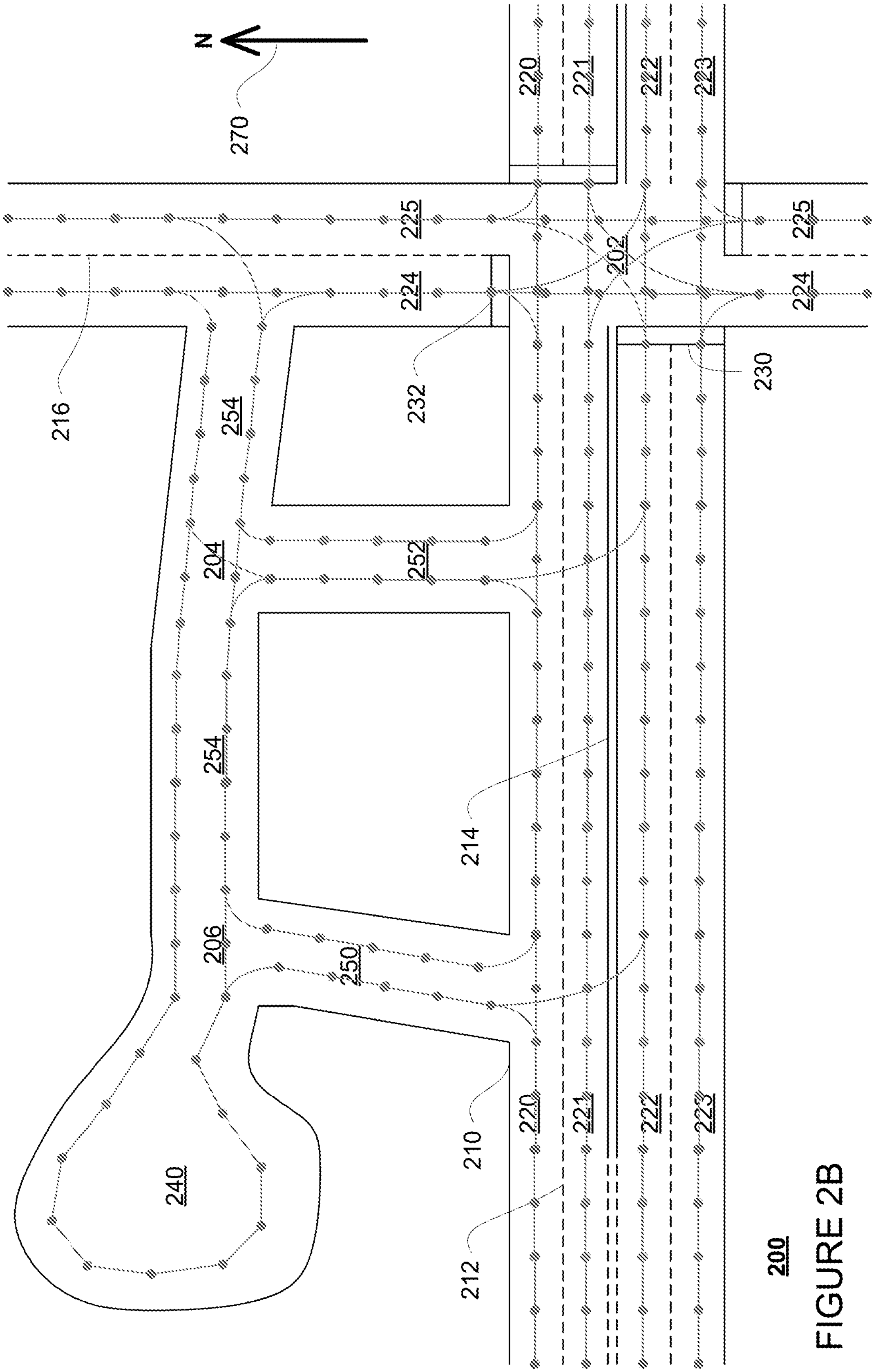

FIGS. 2A-2B are an example of map information 200 for a section of roadway including intersections 202, 204, 206 which may be stored locally at the autonomous vehicle 100. As identified in FIG. 2A depict a portion of the map information that includes information identifying the shape, location, and other characteristics of lane markers, lane lines curbs or other road edges 210, 212, 214, 216 which define the shape, location and other characteristics of lanes 220, 221, 222, 223, 224, 225, as well as stop lines 230, 232 and traffic control devices, such as traffic signal lights 260, 262. The map information also includes other types of drivable areas such as cul-de-sac 240 and side streets 250, 252, 254 which do not necessarily include lane lines but may allow for traffic to move in different directions. Arrow 270 provides a directional arrow for reference only and need not necessarily be included in the map information as such. However, in addition to these features, the map information may also include information that identifies the direction of traffic and speed limits for each lane or other drivable area as well as information that allows the computing devices 110 to determine whether the vehicle has the right of way to complete a particular maneuver (i.e. complete a turn or cross a lane of traffic or intersection), as well as other features such as buildings, waterways, vegetation, signs, etc.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). For example, FIG. 2B represents example nodes, represented by solid circles, as well as edges between those nodes, represented by the connecting lines between the solid circles. The nodes and edges of the map information 200 as depicted in FIG. 2B are merely an example configuration for the area of the map information. The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which edges or lanes or other mapped areas are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
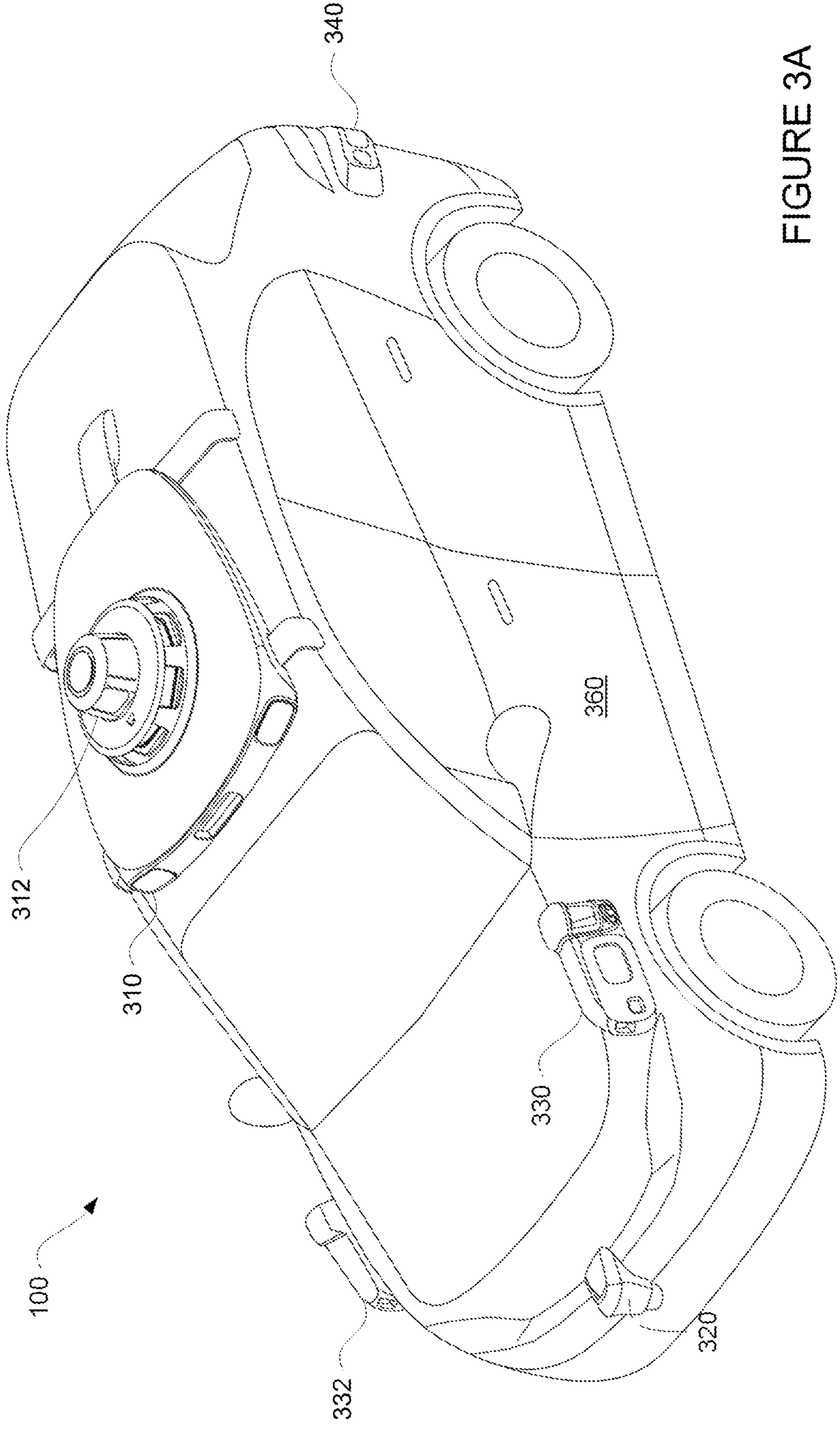
FIG. 3A-3B are example external views of a vehicle in accordance with aspects of the disclosure.
Figure 3B:
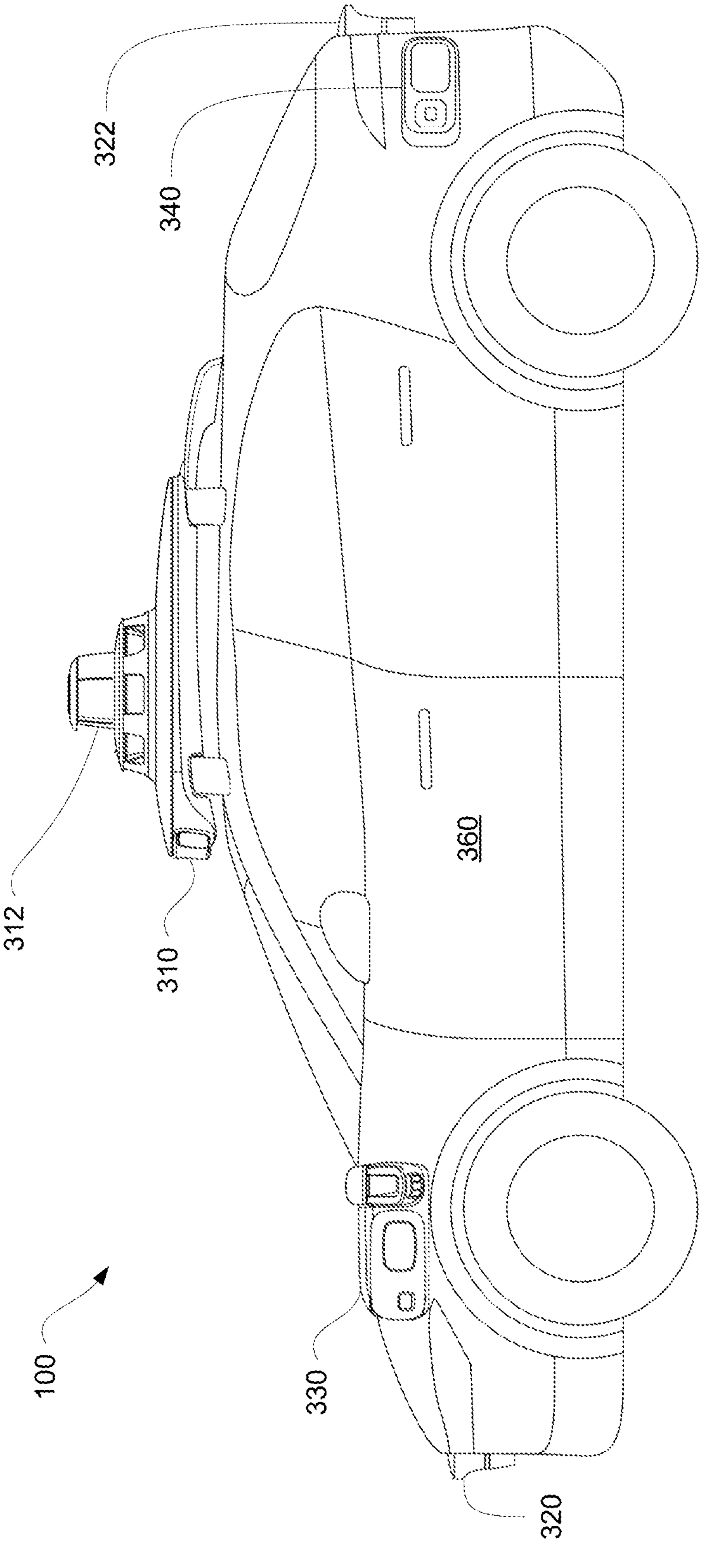

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, forward planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
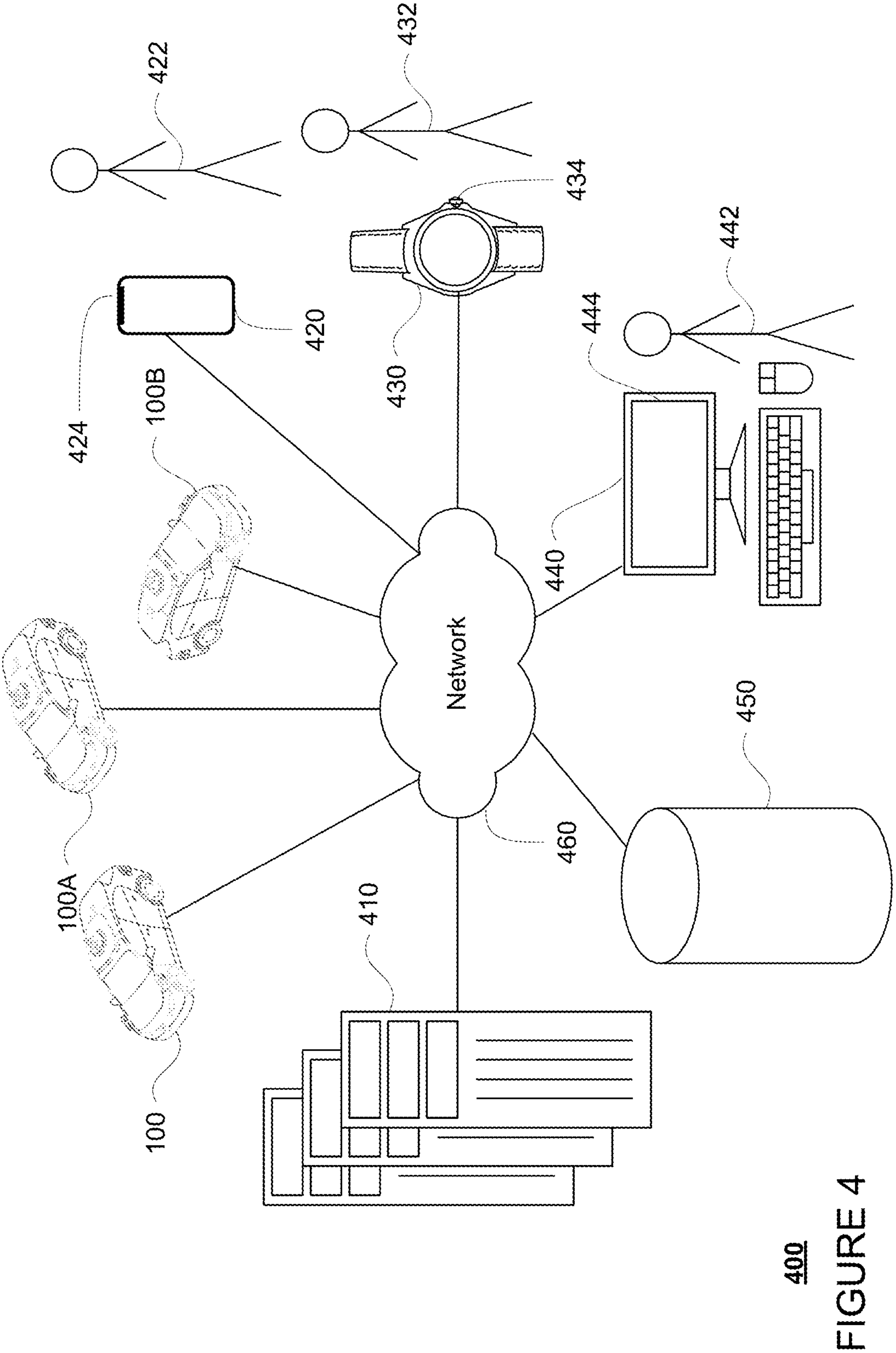
FIG. 4 is a pictorial diagram of an example system in accordance with aspects of the disclosure.
Figure 5:
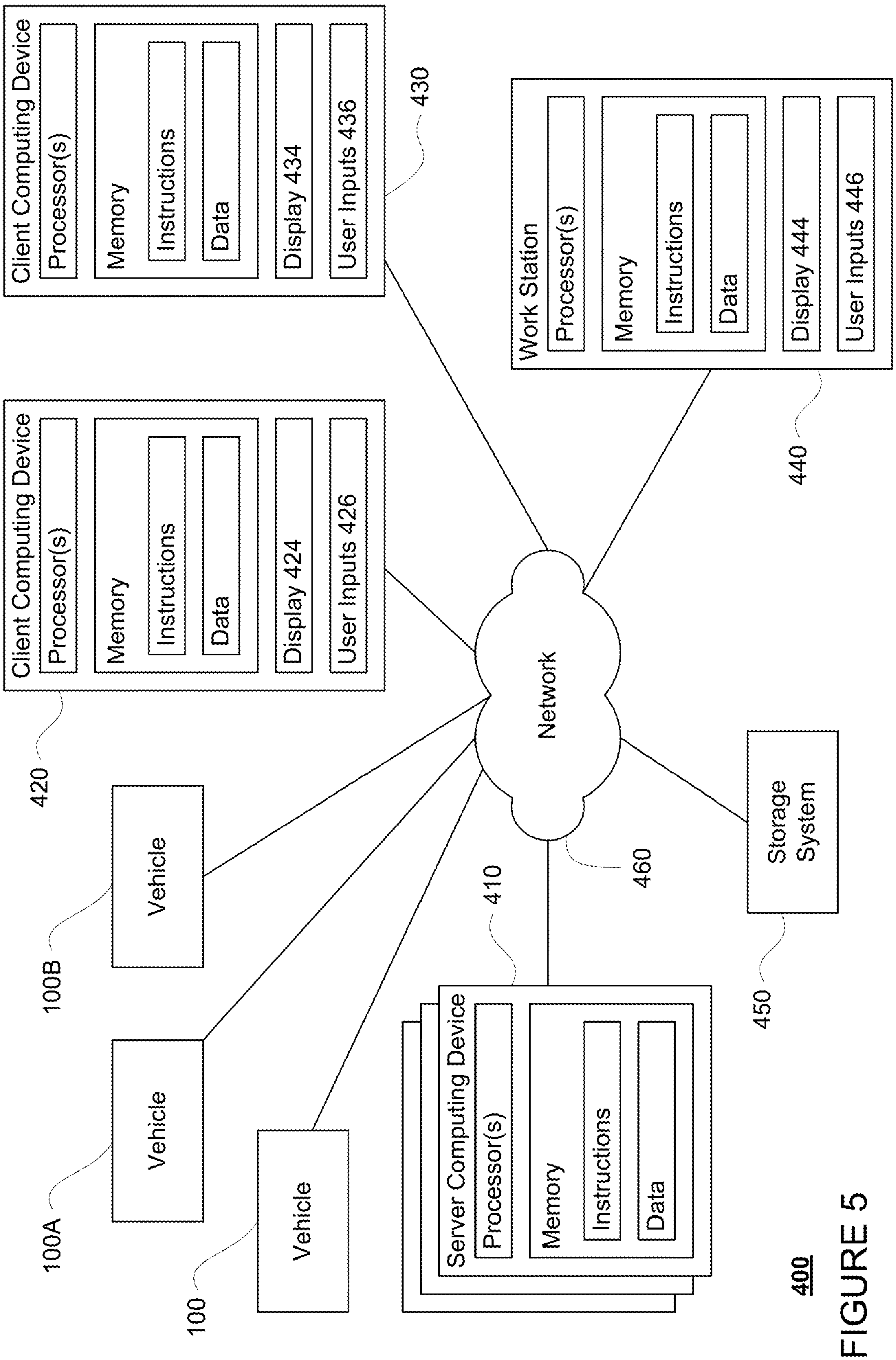
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations.

In this regard, the server computing devices 410 may function as a fleet management system which can be used to track the status of autonomous vehicles of the fleet and arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of a vehicle. In other words, user 422 may represent a passenger. In addition, client computing device 430 may represent a smart watch for a passenger of a vehicle. In other words, user 432 may represent a passenger. The client computing device 440 may represent a workstation for an operations person, for example, a remote assistance operator or someone who may provide remote assistance to an autonomous vehicle and/or a passenger. In other words, user 442 may represent an operator (e.g. operations person) of a transportation service utilizing the autonomous vehicles 100, 100A, 100B. Although only a few passengers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc. Storage system 450 may store various types of information which may be retrieved or otherwise accessed by a server computing device, such as one or more server computing devices 410, in order to perform some of the features described herein.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 17:
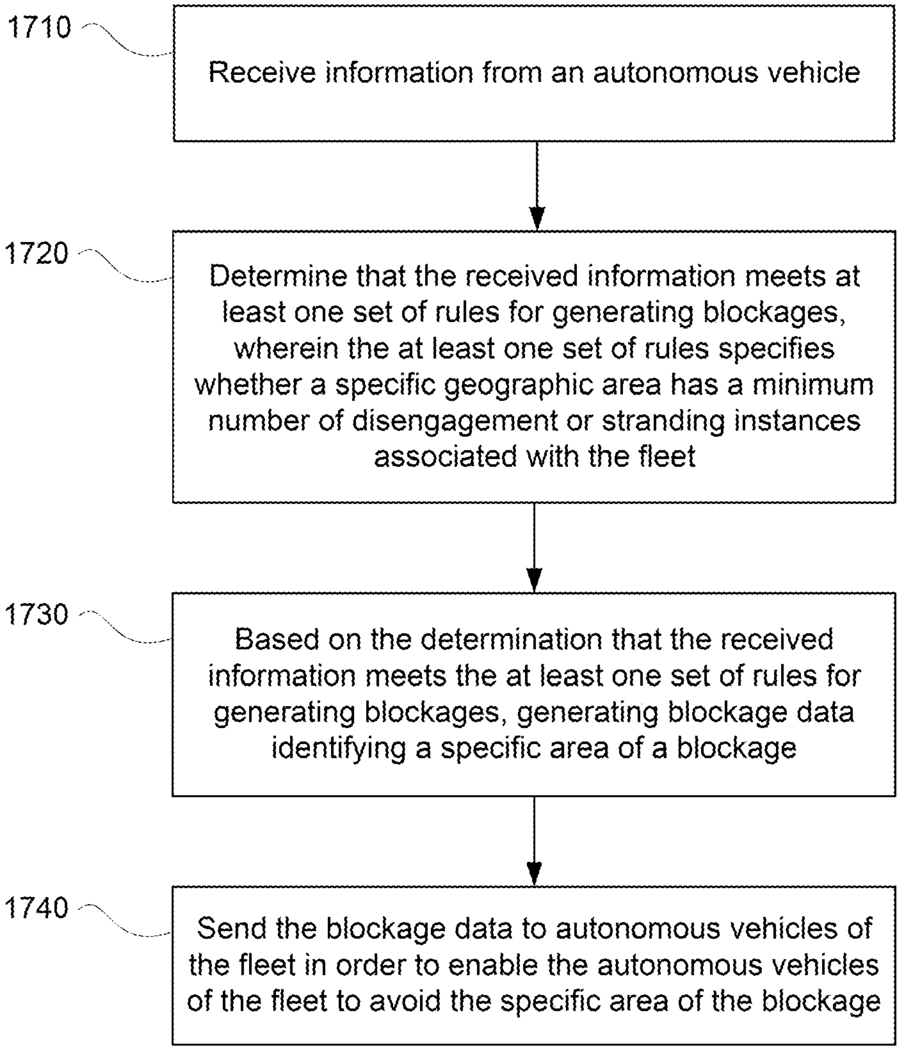
FIG. 17 is a flow diagram in accordance with aspects of the disclosure.

FIG. 17 is an example flow diagram 1700 depicting an example method of generating blockages in map information for use by a fleet of autonomous vehicles, such as the one or more processors of the server computing devices 410 functioning as a fleet management system. At block 1710, information from an autonomous vehicle is received. For instance, such information may be received by the one or more processors of the server computing system 410.

FIGS. 6-10 depict examples of autonomous vehicle 100 in a geographic area 600 corresponding to the map information 200. In these example, intersections 602, 604, 606 correspond to intersections 202, 204, 206, lane markers, lane lines curbs or other road edges 610, 612, 614, 616 correspond to lane markers, lane lines curbs or other road edges 210, 212, 214, 216, lanes 620, 621, 622, 623, 624, 625 correspond to lanes 220, 221, 222, 223, 224, 225, stop lines 630, 632 correspond to stop lines 230, 232, cul-de-sac 640 corresponds to cul-de-sac 240, side streets 650, 652, 654 correspond to side streets 250, 252, 254, traffic signal lights 660, 662 correspond to traffic signal lights 260, 262, and so on. Similar to arrow 270, arrow 670 provides a directional arrow for reference only and need not necessarily be included in the map information as such.

As noted above, as the autonomous vehicle 100 drives around, the perception system 174 may detect and identify objects in the vehicle's environment. For example, the perceptions system of the autonomous vehicle may use sensors to detect and identify road users (e.g., pedestrians, bicyclists, vehicles, etc.), fences, construction objects (e.g., cones, fences, barriers), signs (e.g., temporary or persistent stop signs, speed limit signs, etc.), traffic control devices, etc. In some instances, certain detectors may be used to identify the location and bounds of certain types of areas which may or may not already be incorporated into the map information such as a school zone, construction zones, etc.

Certain of this information generated by the perception system as well as other information about the status of the autonomous vehicle may be sent to the server computing devices 410. For example, the other information may include the pose (e.g., position and orientation of the autonomous vehicle), speed, and other characteristics. This information may be sent via a network, such as a mobile network including 4G or 5G depending on what is available where the autonomous vehicle is currently located. In this regard, the server computing devices 410 may receive the information from the plurality of vehicles as a stream of coordinates for respective perception objects.

In this regard, such transmission of the information to the system may occur in real time. For example, every autonomous vehicle in the fleet may transmit in real time the objects or agents perceived while driving around in its respective environment, and transmit its observations to the fleet management system. In such examples, every autonomous vehicle of the fleet may maintain a local version of the map information and be able to receive, in real time, updates for the map information from the server computing devices 410. The updates may be generated based on the observations of the other autonomous vehicles of the fleet as discussed further below.

Returning to FIG. 17, at block 1720, that the received information meets at least one set of rules for generating blockages is determined. For instance, the received information may be compared by the server computing devices 410 to at least one set of rules for generating different types of blockages. In this regard, the server computing devices 410 may function as a rules—Each set of rules may be associated with, for example, a minimum number of autonomous vehicles, such as autonomous vehicle 100, reporting information that meets the rules of the set of rules. In some instances, sets of rules may be associated with a timing constraint for meeting the set of rules. In addition, each set of rules may be associated with blockage generation instructions and a blockage time as discussed further below.

For example, one set of rules may correspond to construction zone blockages. This set of rules may be associated with a minimum number of autonomous vehicles being at least 1. The set of rules may include that the autonomous vehicle 100 includes a passenger or a safety (monitoring) driver, that the safety driver switched the autonomous vehicle from autonomous driving mode to a manual driving mode (e.g., a disengage) or that a remote assistance operator had to send a command to prevent the autonomous vehicle from becoming or remaining stranded (e.g., a stranding), that the autonomous vehicle has perceived one or more construction objects (e.g., fences or cones), the perception system has detected a construction zone, that there is no existing blockage nearby in the map information (local to the server computing devices 410) which may cause the autonomous vehicle to have to enter into the autonomous vehicle's current location (i.e., there is a high penalty for entering the existing blockage or some other nearby location), that the construction zone is located in front of the autonomous vehicle, and that the autonomous vehicle is not current located within a depot or other secure location for the fleet of autonomous vehicle. In addition, the timing constraint may include a minimum amount of time for the autonomous vehicle to be operated in manual driving mode or that the autonomous vehicle is controlled based on instructions received from the remote assistance operator, such as 5 seconds or more or less.

Figure 6:
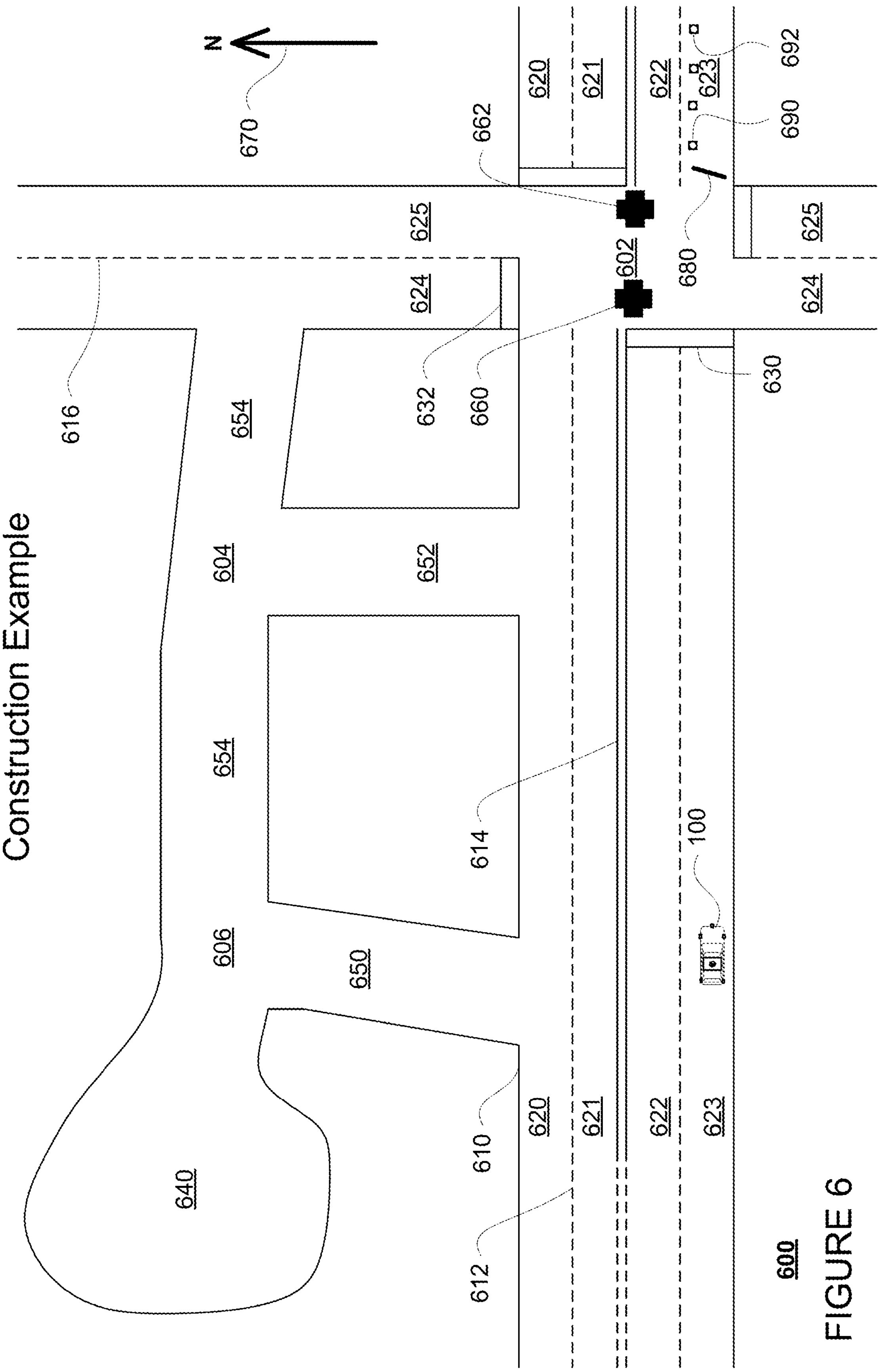
FIG. 6 is an example representation of an autonomous vehicle driving in a geographic area in accordance with aspects of the disclosure.

FIG. 6 is an example of autonomous vehicle 100 approaching a construction zone delineated by a fence 680 as well as other construction objects, such as cones 690, 692, located in lane 623. In this example, the computing devices 110 may determine that the autonomous vehicle is approaching a construction zone. Information identifying the location and orientation of the autonomous vehicle as well as the determined characteristics of the construction zone (e.g., size, shape location, construction object details such as type, size and location, etc.) may be sent to the server computing devices, for instance via the network 460. The server computing devices may compare the received information from the autonomous vehicle 100 and/or other autonomous vehicles to the set of rules for construction zone blockages to determine whether the set of rules for construction zone blockages has been met.

As another example, one set of rules may correspond to potential construction blockages. This set of rules may be associated with a minimum number of autonomous vehicles being at least one or more. The set of rules may include that two or more construction objects are detected within some threshold distance (e.g., within 15 meters or more or less) of the autonomous vehicle. In addition, the timing constraint may include a minimum amount of time for the autonomous vehicle to be operated in manual driving mode or that the autonomous vehicle is controlled based on instructions from the remote assistance operator, such as 5 seconds or more or less. In this regard, even though the perception system has not actually detected a construction zone, the server computing devices 410 may still be able to generate a blockage.

Figure 7:
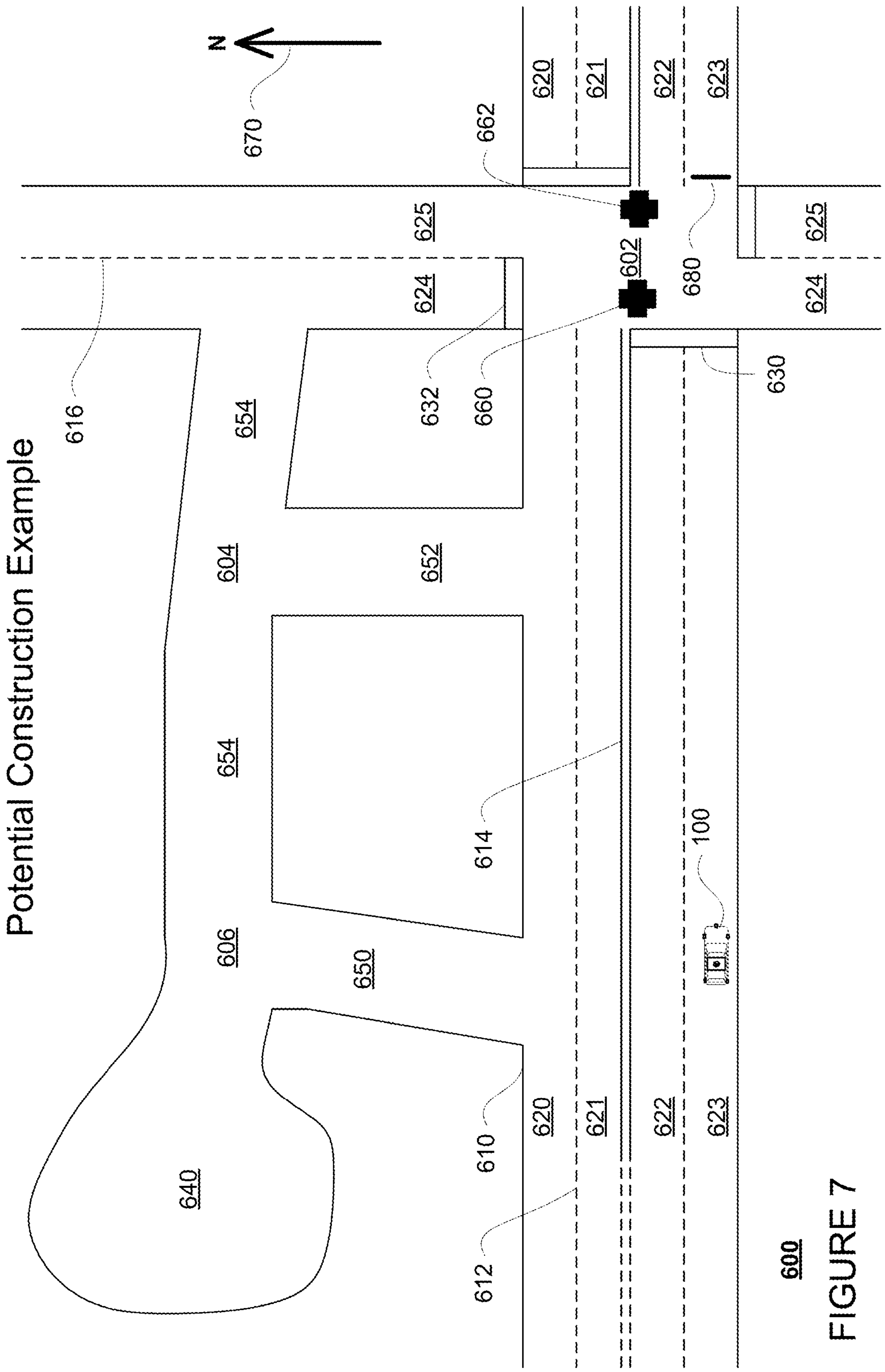
FIG. 7 is an example representation of an autonomous vehicle driving in a geographic area in accordance with aspects of the disclosure.

FIG. 7 is an example of autonomous vehicle 100 approaching a fence 780 located in lane 623. In this example, the computing devices 110 may not necessarily determine that the autonomous vehicle is approaching a construction zone. However, information identifying the location and orientation of the autonomous vehicle as well as the characteristics (e.g., the type, size and location) of the fence 780 detected by the perception system 174 may be to the server computing devices, for instance via the network 460. The server computing devices may compare the received information from the autonomous vehicle 100 and/or other autonomous vehicles to the set of rules for potential construction zone blockages to determine whether the set of rules for potential construction zone blockages has been met.

As another example, one set of rules may correspond to stranding or disengage blockages. This set of rules may be associated with a minimum number of autonomous vehicles being at least two or more. The set of rules may include that a specific geographic area has a minimum number of disengagements or strandings, for example, at least two. In addition, the timing constraint may include a sliding window of some fixed period of time such as the last 24 hours or more or less and evaluated every 15, 30, 60 minutes or more or less.

As another example, one set of rules may correspond to a fallback blockages. This set of rules may be associated with a minimum number of autonomous vehicles being at least one or more. The set of rules may include that an autonomous vehicle has reported its status as corresponding to an error situation or fallback state such as when the autonomous vehicle must stop or pull over immediately, is no longer generating trajectories, or some other hardware or software error or failure has occurred. The set of rules may also include that the autonomous vehicle includes a passenger or a safety (monitoring) driver and that there is no existing blockage nearby in the map information which may cause the autonomous vehicle to have to enter into the autonomous vehicle's current location. In this example, a timing constraint may not be necessary.

Figure 8:
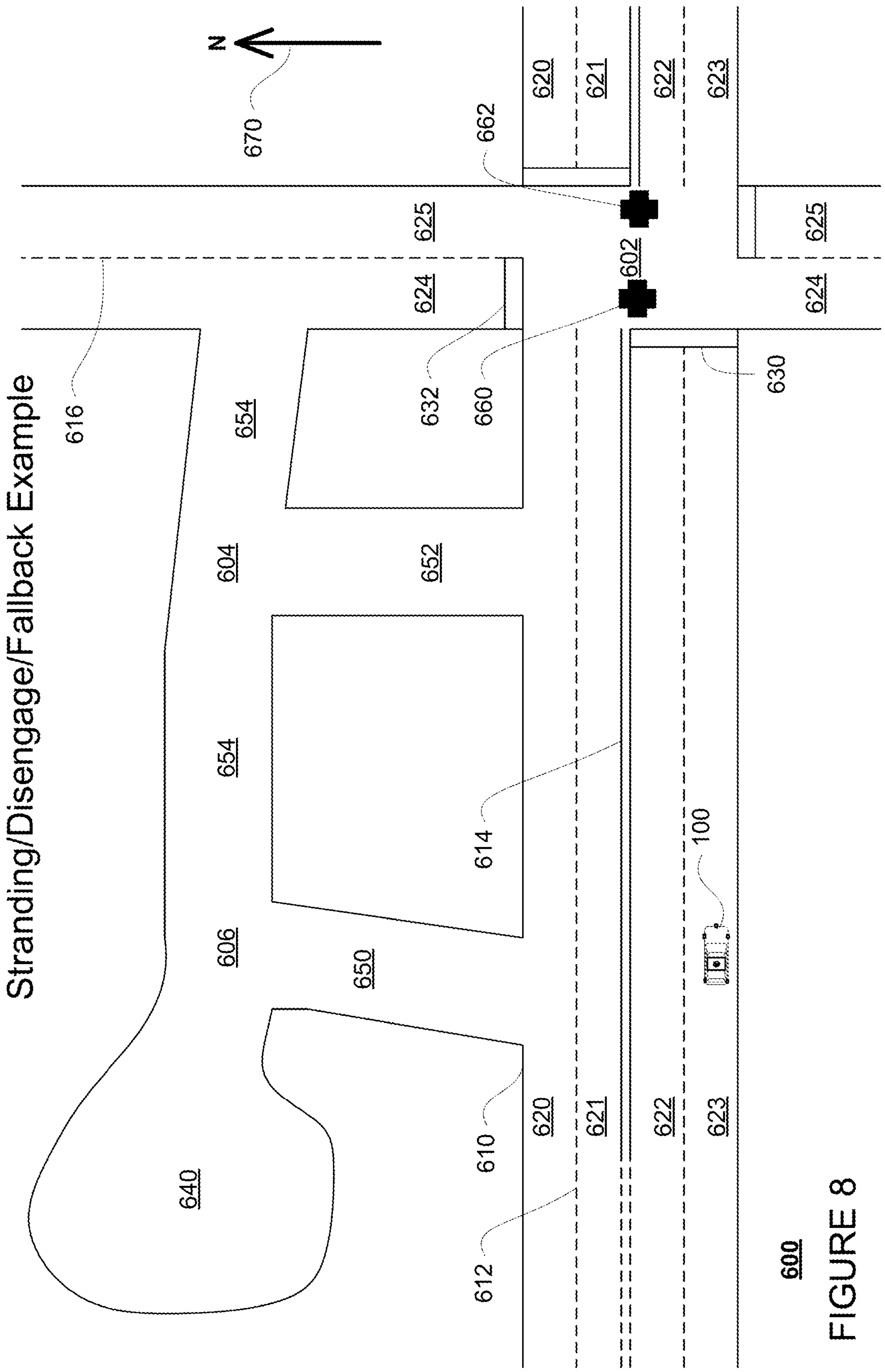
FIG. 8 is an example representation of an autonomous vehicle driving in a geographic area in accordance with aspects of the disclosure.

FIG. 8 is an example of autonomous vehicle 100 driving in lane 623. In this example, the autonomous vehicle has become stranded, has disengaged from the autonomous driving mode to a semi-autonomous driving mode or a manual driving mode, or has entered into a fallback state. In this example, the computing devices 110 may send stranding or disengagement information or information indicating the location and orientation of the autonomous vehicle as well as an indication that the autonomous vehicle has become stranded or has experienced a stranding incident, has disengaged from the autonomous driving mode to a semi-autonomous driving mode or a manual driving mode or has experienced a disengagement incident, or has entered into the fallback state to the server computing devices, for instance via the network 460. The server computing devices may compare the received information from the autonomous vehicle 100 and/or other autonomous vehicles to the set of rules for stranding or disengage blockages or fallback blockages to determine whether the set of rules for stranding or disengage blockages or fallback blockages has been met. In this example, the server computing devices 410 may need to receive information from a plurality of autonomous vehicles before being able to determine that the rules for stranding or disengage blockages have been met.

As another example, one set of rules may correspond to volume blockages. This set of rules may be associated with a minimum number of autonomous vehicles being at least five, seven, or more or less. The set of rules may include that a specific geographic area has a minimum number of vehicles traversing the same location (e.g., road graph edges), lanes of less than a certain number in each direction of traffic or less than a certain width, etc. This may prevent situations in which a plurality of autonomous vehicles inadvertently creates traffic in certain areas or become stranded and create physical barriers to the flow of traffic in the area.

Figure 9:
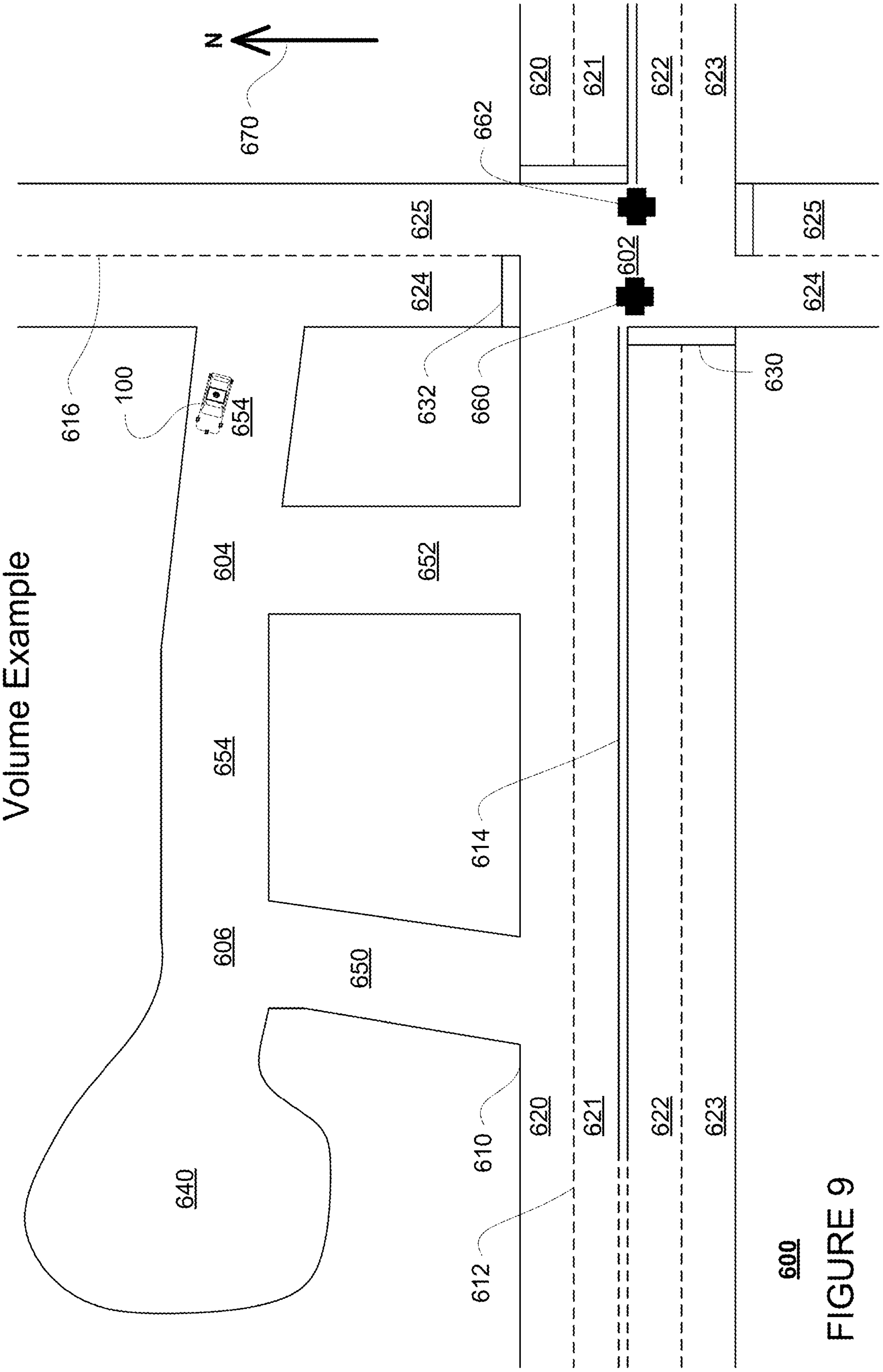
FIG. 9 is an example representation of an autonomous vehicle driving in a geographic area in accordance with aspects of the disclosure.

FIG. 9 is an example of autonomous vehicle 100 driving in side street 654 in a generally westward direction towards intersection 604. In this example, the computing devices 110 may send information indicating the location and orientation of the autonomous vehicle to the server computing devices, for instance via the network 460. The server computing devices may compare the received information from the autonomous vehicle 100 and/or other autonomous vehicles to the set of rules for volume blockages to determine whether the set of rules for volume blockages has been met. In this example, the server computing devices 410 may need to receive information from a plurality of autonomous vehicles before being able to determine that the rules for volume blockages have been met.

Similar to volume blockages, as another example, one set of rules may correspond to cul-de-sac blockages. This set of rules may be associated with a minimum number of autonomous vehicles being at least two, at least five, or more or less. The set of rules may include that a specific cul-de-sac in the map information was traversed by autonomous vehicles of the fleet more than five times. In addition, the timing constraint may include a sliding window of some fixed period of time such as the last 24 hours or more or less and evaluated every 15, 30, 60 minutes or more or less.

Figure 10:
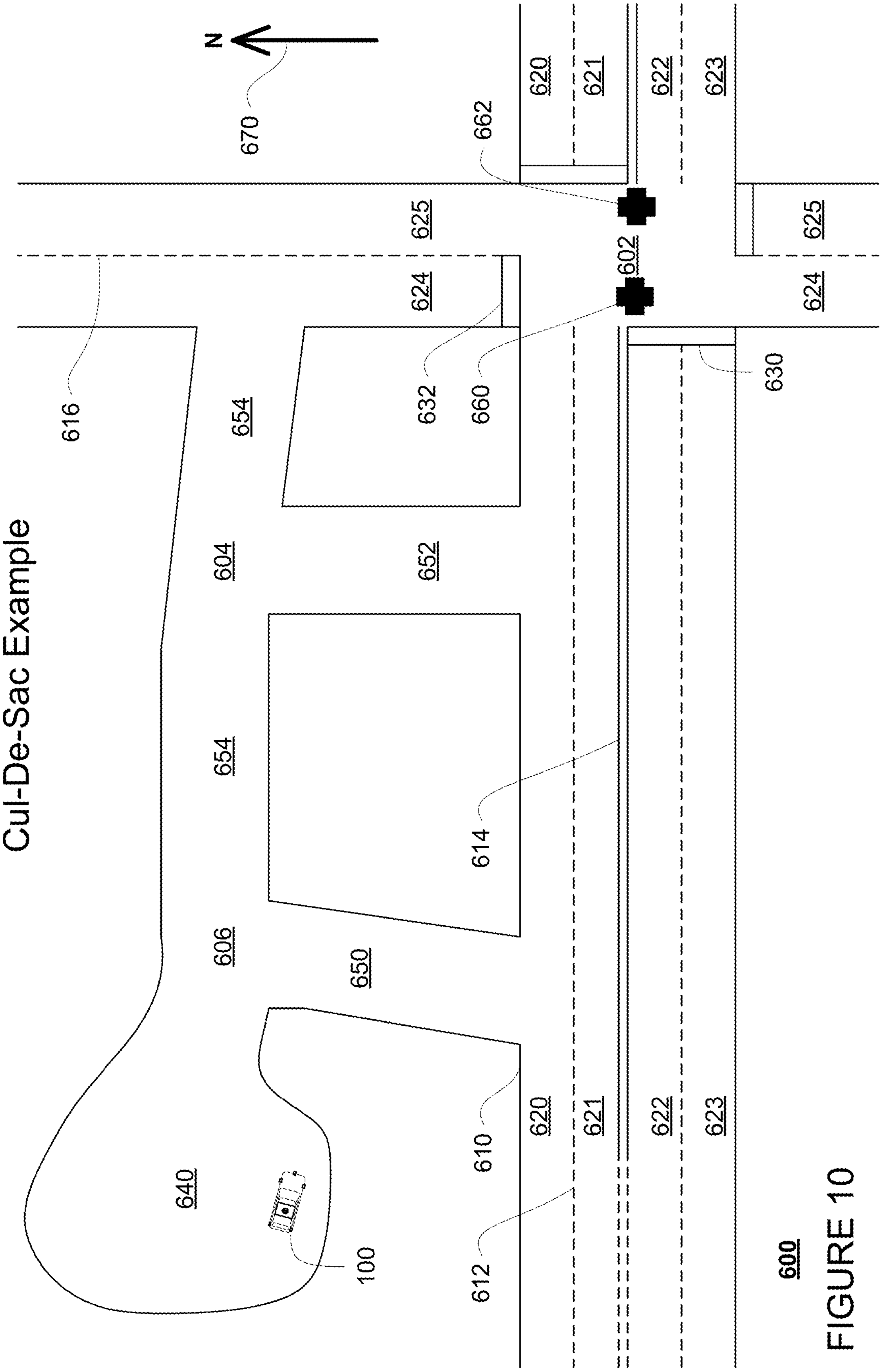
FIG. 10 is an example representation of an autonomous vehicle driving in a geographic area in accordance with aspects of the disclosure.

FIG. 10 is an example of autonomous vehicle 100 driving in cul-de-sac 640 in a generally eastward direction towards intersection 606. In this example, the computing devices 110 may send information indicating the location and orientation of the autonomous vehicle to the server computing devices, for instance via the network 460. The server computing devices may compare the received information from the autonomous vehicle 100 and/or other autonomous vehicles to the set of rules for cul-de-sac blockages to determine whether the set of rules for cul-de-sac blockages has been met. In this example, the server computing devices 410 may need to receive information from a plurality of autonomous vehicles before being able to determine that the rules for cul-de-sac blockages have been met.

Because there may be various sets of rules for different types of blockages, to improve efficiency of the fleet management system, the server computing devices may only compare data as needed. For example, if the set of rules for cul-de-sac blockages limits the number of autonomous vehicles passing through the same cul-de-sac over a certain period of time, the server computing devices 410 need only compare the location and orientation information received from the autonomous vehicles to determine whether the set of rules for cul-de-sac blockages has been met within that certain period of time. At the same time, for the set of rules for potential construction zones, the server computing devices 410 may consider the location and orientation of the autonomous vehicle as well as construction objects such as fences, cones, and temporary signs, as well as nearby features of the road such as lane lines, curbs or other features defining a road edge. As new information is received by the server computing devices, this information may be sent to different applications of the server computing devices in order to process the data and determine whether a particular set of rules for blockages has been met.

Returning to FIG. 17, at block 1730, based on the determination that the received information meets at least one set of rules for generating blockages, a blockage data identifying a specific area of a blockage is generated. As noted above, a blockage may include an area of map information to be avoided by an autonomous vehicle. For instance, if any of the sets of rules are met by the received information, the server computing devices 410 may generate blockage data for a blockage for a particular area. Depending upon which set of rules is met, the server computing devices 410 may generate the blockage in different ways. In this regard as noted above, each set of rules may be associated with blockage generation instructions for generating blockage data for a blockage including a specific area. This specific area may be as granular as a specific section of a lane, sections of a plurality of lanes, an intersection, or even larger areas. As an example, the blockage data may be defined by a polygon and/or nodes and edges of the map information within such a polygon. The blockage data may be stored in the map information maintained by the server computing devices, such as a version of the map information stored in the storage system 450.

Figure 11:
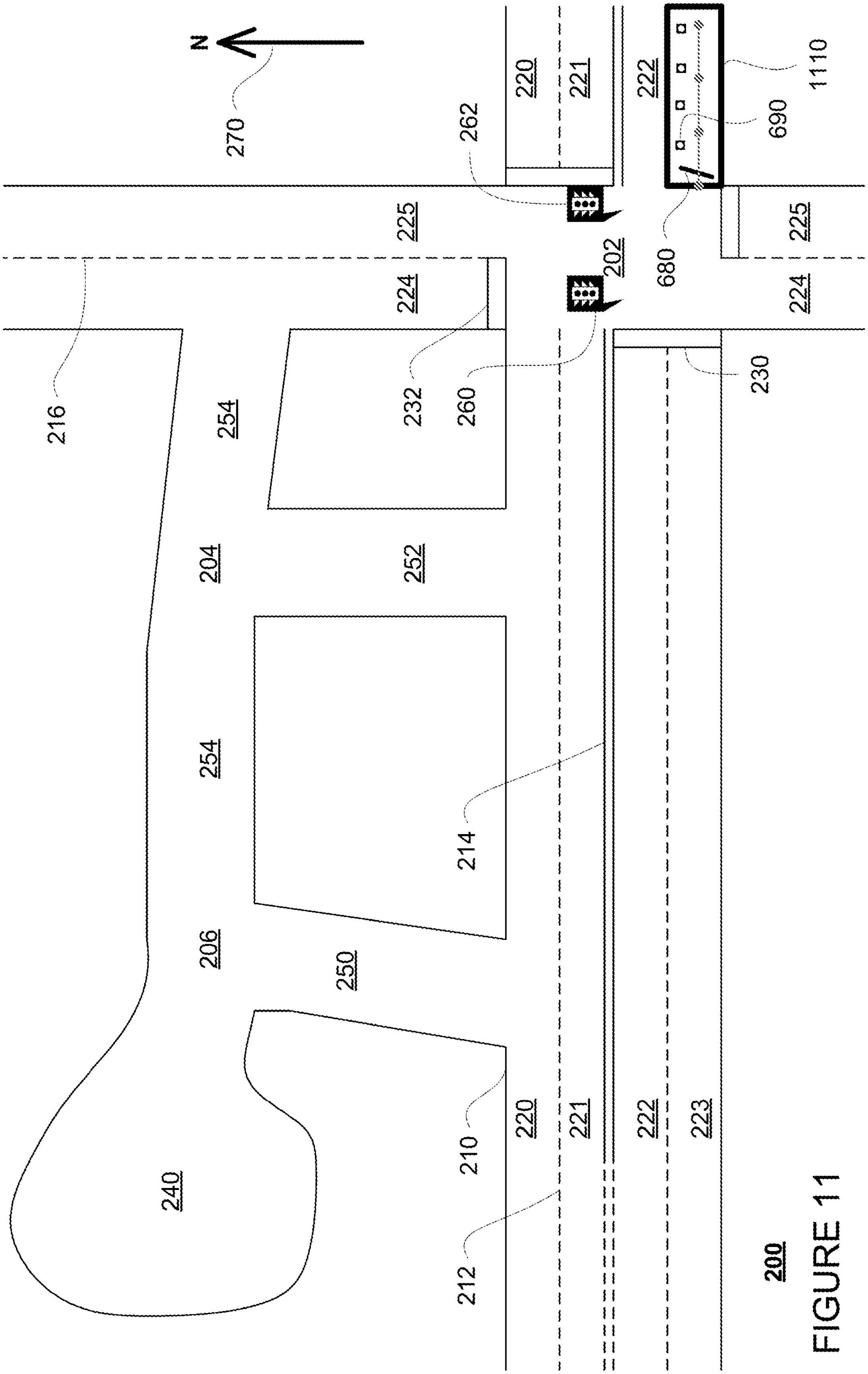
FIG. 11 is an example representation of a specific area of a blockage in accordance with aspects of the disclosure.

For example, for construction zone blockages, blockage data for a blockage may be generated corresponding to a specific area of a construction zone determined by the autonomous vehicle's perception system. FIG. 11 is an example representation of a specific area of a construction zone blockage 1110 corresponding to the area of the construction zone depicted in FIG. 6. The construction zone objects of FIG. 6 are depicted for reference, but need not be included in the map information. In this example, the construction zone blockage 1110 may include the nodes and edges of the map information depicted in FIG. 11.

Figure 12:
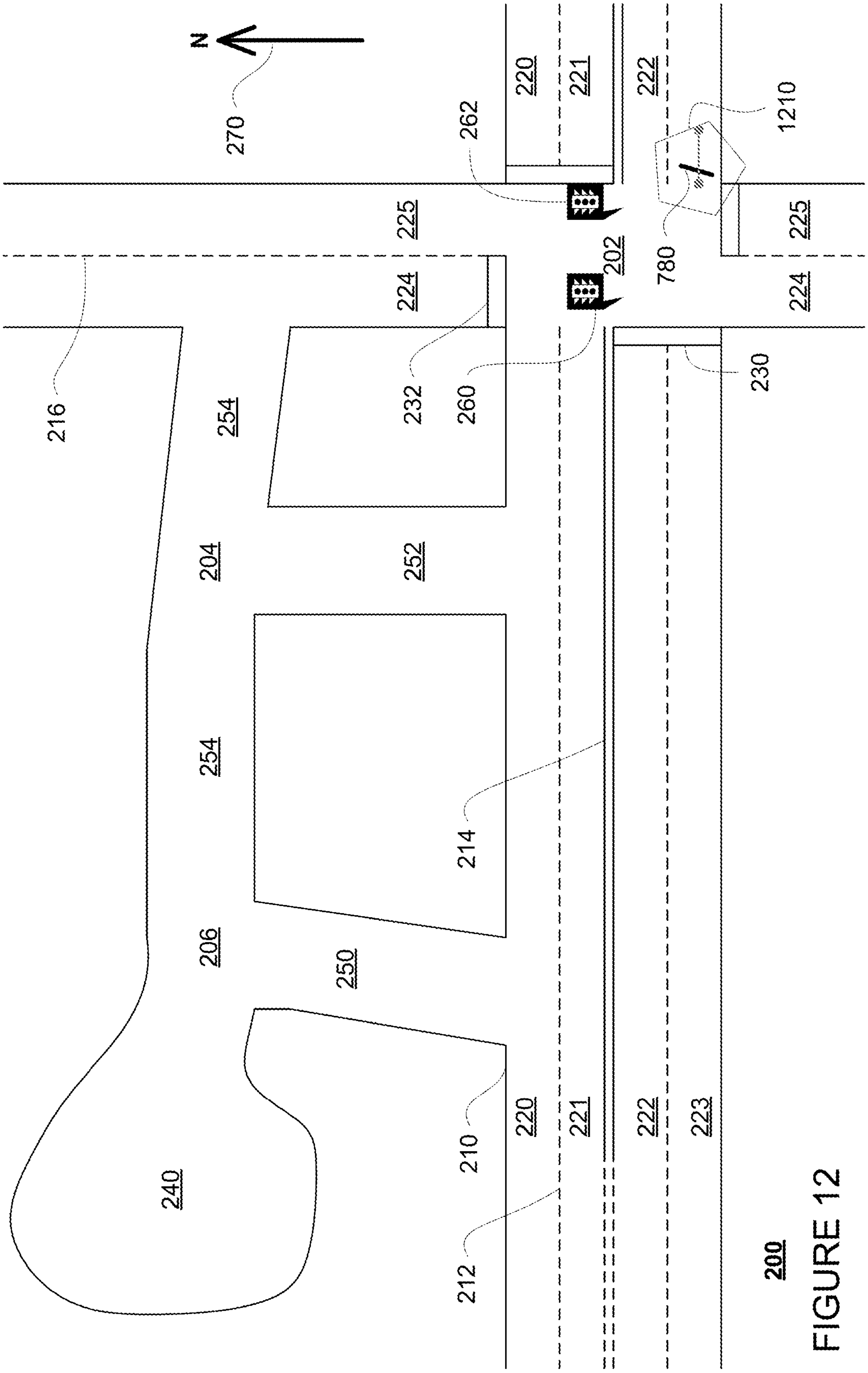
FIG. 12 is an example representation of a specific area of a blockage in accordance with aspects of the disclosure.

For example, for a potential construction zone blockage, blockage data for a blockage may be generated using a polygon of a predetermined size. For example, blockage data for a blockage may be generated to correspond to a pentagon with a 5 m radius of some point at or within the potential construction zone. This may be sufficient for a short period of time (e.g., a few hours or so) before a human operator is available to check the details of the automatically-created blockage and leave the blockage or create a new, more appropriate one. In other examples, the geometry of a lane and other roadgraph annotations on roadgraph features may be used to determine the geometry and size of the polygon. FIG. 12 is an example representation of a specific area of a potential construction zone blockage 1210 corresponding to a pentagon of a predetermined size at the location of the fence 780. In this example, the potential construction zone blockage 1210 may include the nodes and edge of the map information depicted in FIG. 12.

Figure 13:
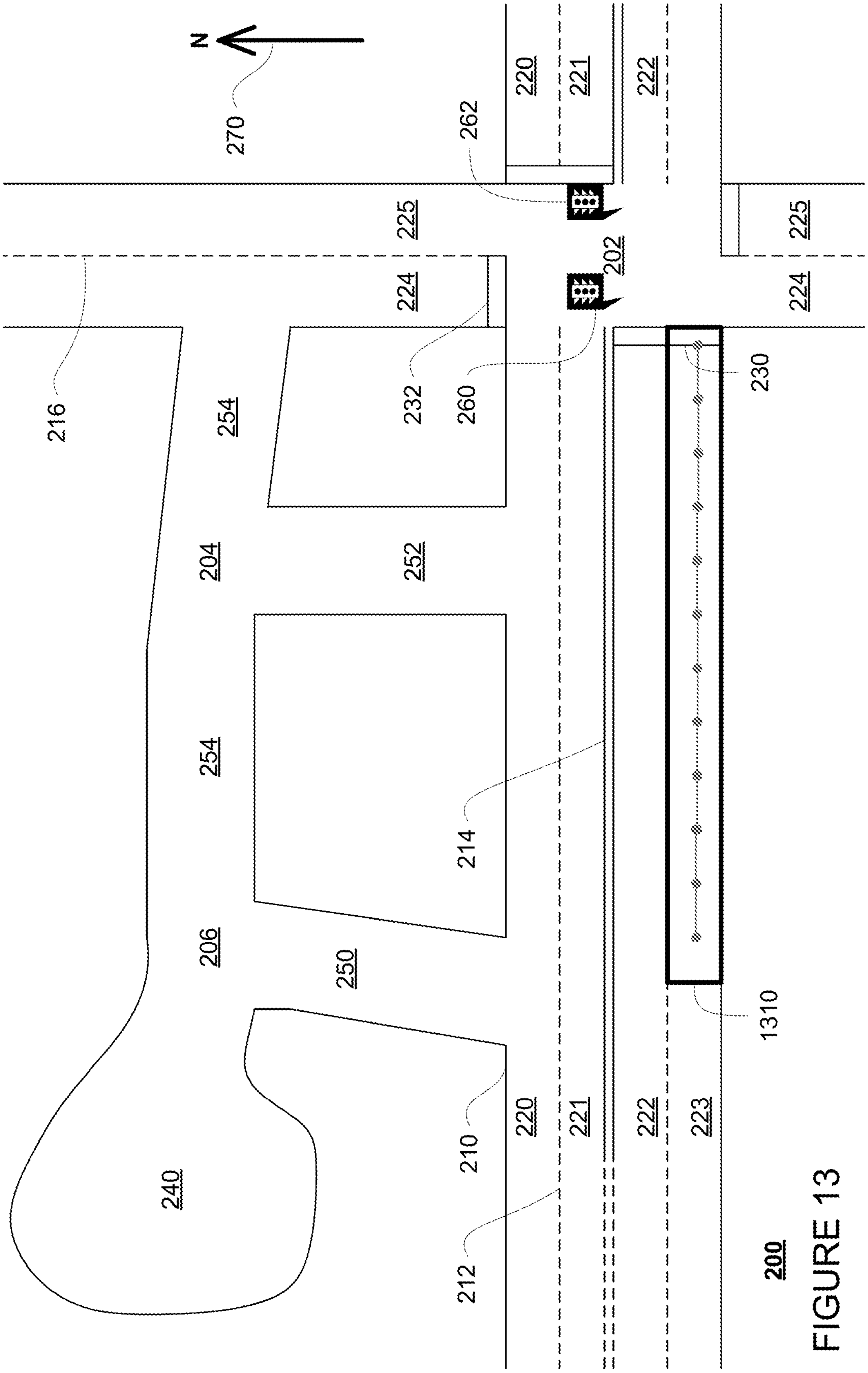
FIG. 13 is an example representation of a specific area of a blockage in accordance with aspects of the disclosure.

For stranding or disengage blockages, the specific area of the blockage may correspond to all lanes moving in the same direction of travel of the lane in which the autonomous vehicles were traveling that reported the stranding or disengaging limited by the closest intersections or some other change to the geometry of the lanes of the blockage. FIG. 13 is an example representation of a specific area of a stranding or disengage blockage 1310 corresponding to the example depicted in FIG. 8. In this example, the stranding or disengage blockage 1310 may include the nodes and edges of the map information depicted in FIG. 13 between the location of the autonomous vehicle 100 (depicted in FIG. 8) to stop line 230 and the beginning of the intersection 202.

Figure 14:
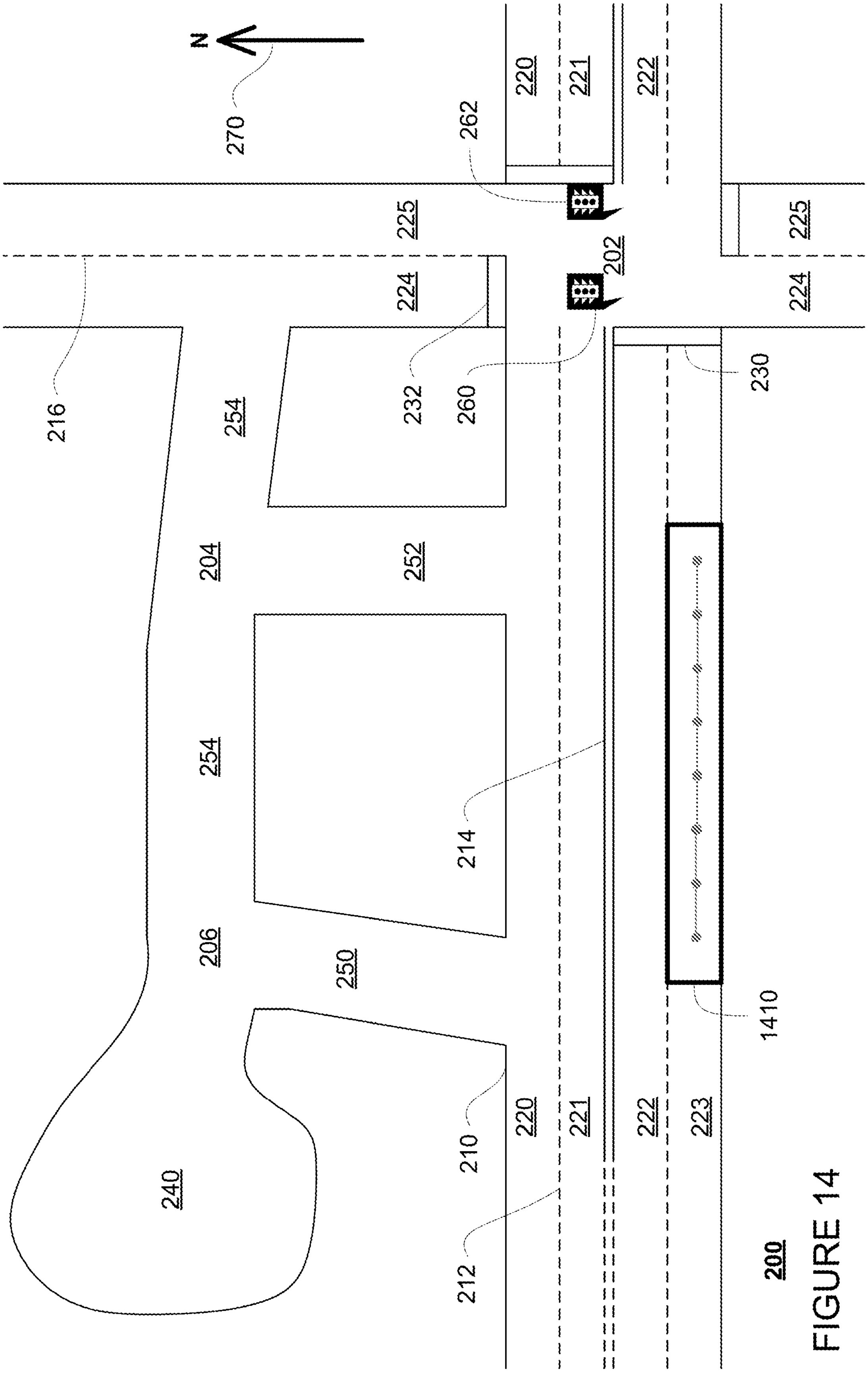
FIG. 14 is an example representation of a specific area of a blockage in accordance with aspects of the disclosure.

For fallback blockages, the specific area of the blockage may be a single lane in which the autonomous vehicle was traveling that reported the fallback extending from the location of the autonomous vehicle when the fallback was for a few dozen meters or more or less. FIG. 14 is an example representation of a specific area of a fallback blockage 1410 corresponding to the example depicted in FIG. 8. In this example, the fallback blockage 1410 may include the nodes and edges of the map information depicted in FIG. 14 between the location of the autonomous vehicle 100 (depicted in FIG. 8) for a few dozen meters within lane 223 (corresponding to lane 623 as in the example of FIG. 8).

Figure 15:
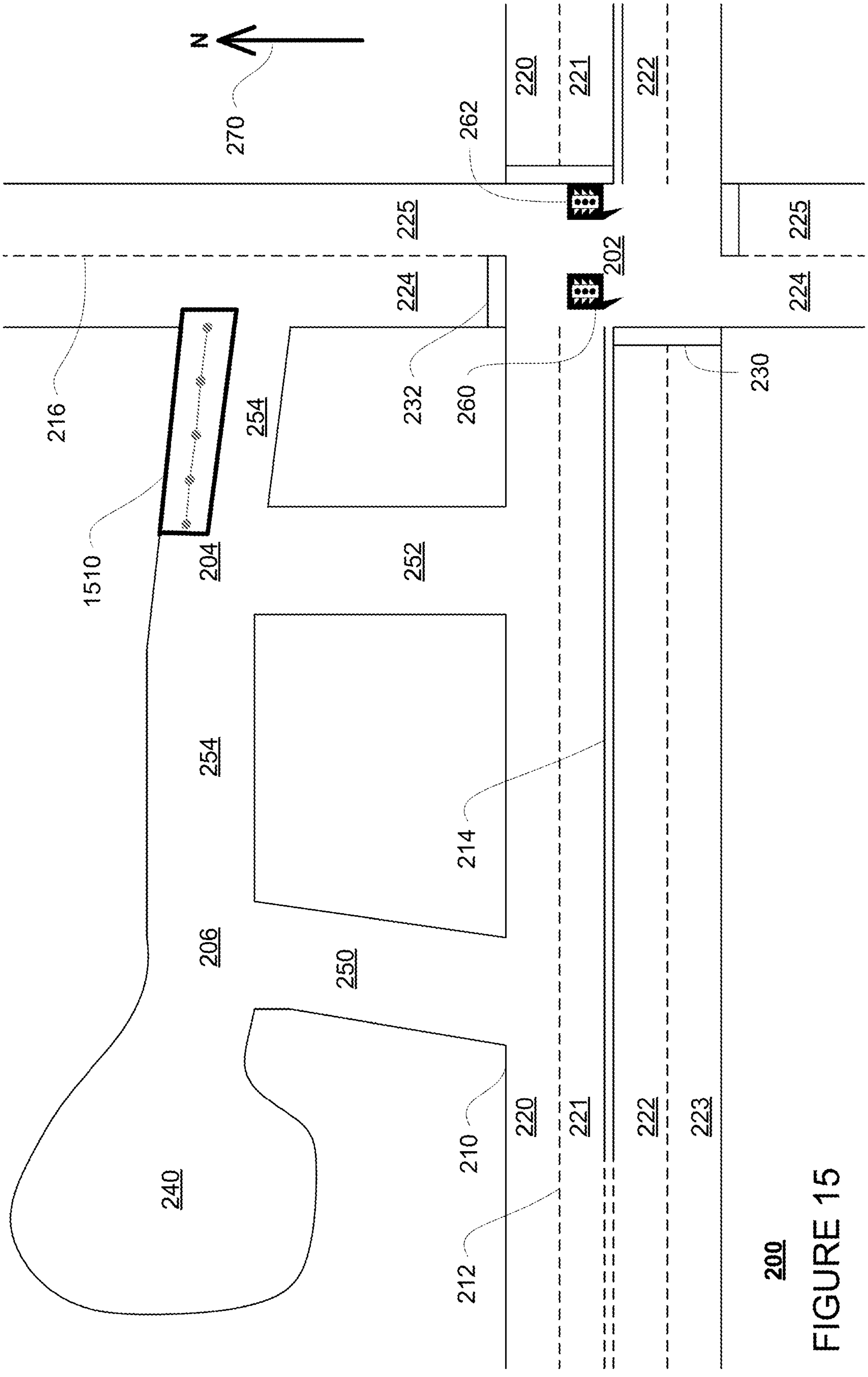
FIG. 15 is an example representation of a specific area of a blockage in accordance with aspects of the disclosure.
Figure 16:
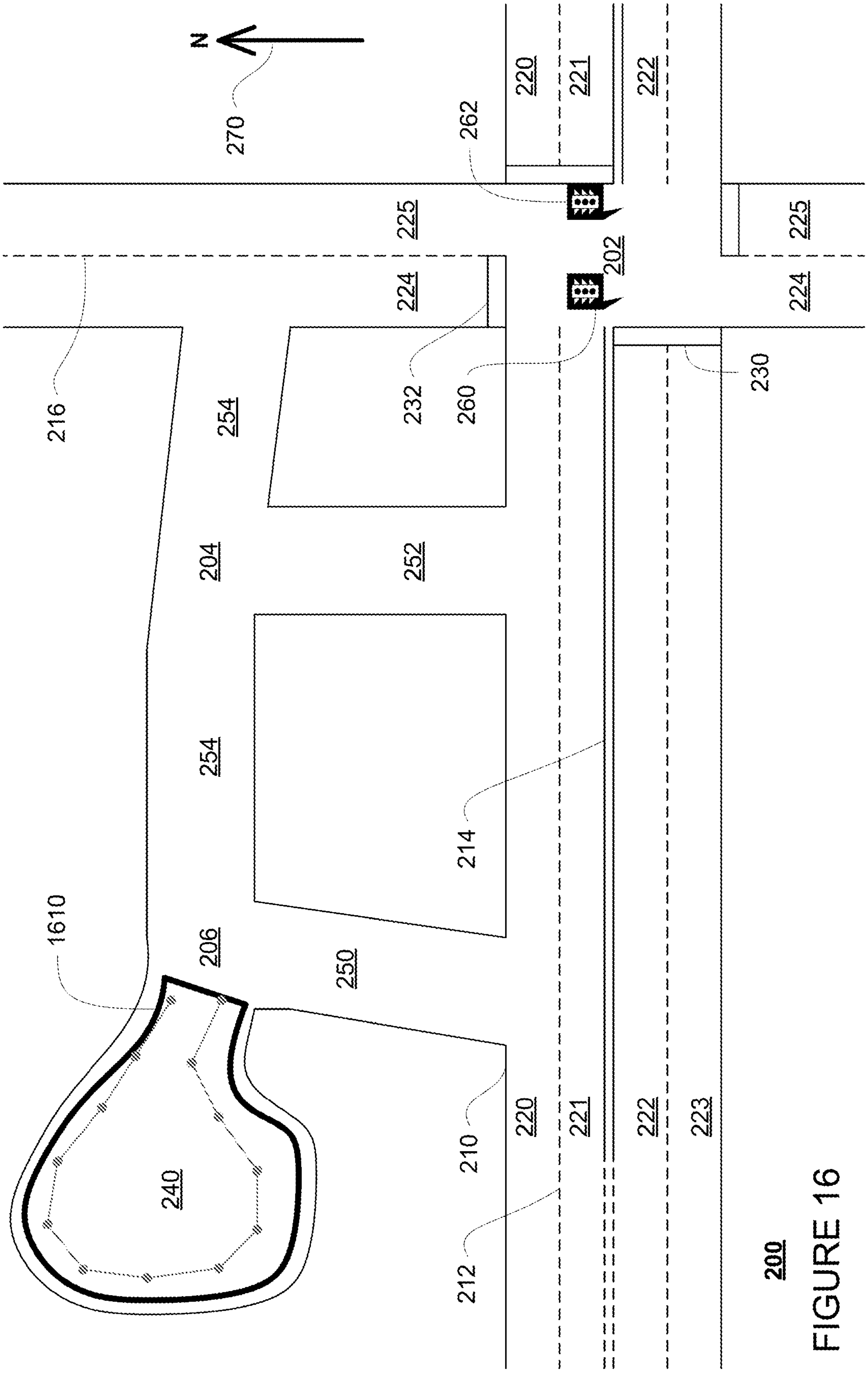
FIG. 16 is an example representation of a specific area of a blockage in accordance with aspects of the disclosure.

For volume blockages (including cul-de-sac blockages), blockage data for a blockage may be generated corresponding to the nodes and edges of where the autonomous vehicles were located or as another example, for all of the nodes and edges within an area of the cul-de-sac. FIG. 15 is an example representation of a specific area of a volume blockage 1510 corresponding to the example depicted in FIG. 9. In this example, the volume blockage 1510 may include the nodes and edges of the map information depicted in FIG. 15 at the various locations the autonomous vehicle 100 which overlapped with the other autonomous vehicles in order to meet the set of rules for the volume blockage. FIG. 16 is an example representation of a specific area of a cul-de-sac blockage 1610 corresponding to the example depicted in FIG. 10. In this example, the cul-de-sac blockage 1610 may include the nodes and edges of the map information depicted in FIG. 16 corresponding to the various locations the autonomous vehicle 100 which overlapped with the locations of other autonomous vehicles in order to meet the set of rules for the volume blockage.

As noted above, in some instances, the server computing devices 410 may identify more than one set of rules that are met. In such instances, the server computing devices 410 may check to determine whether a blockage already exists at the area where a new blockage would be generated. For instance if there is any overlap between a blockage in the map information and the area of a new blockage (e.g., one or more nodes or edges in common), the server computing devices 410 need not generate the new blockage.

Returning to FIG. 17, at block 1740, the blockage data is sent to autonomous vehicles of the fleet in order to enable the autonomous vehicles of the fleet to avoid the specific area of the blockage. Again, as noted above, a blockage may include an area of map information to be avoided by such autonomous vehicles. Once blockage data is generated, server computing devices 410 may broadcast blockage data or information identifying the specific area of the blockage to all or some of the autonomous vehicles of the fleet. For instance, the blockage data sent to the autonomous vehicles need only identify edges and/or nodes of the road graph which are associated with some change (e.g., of the blockage). This may provide an efficient and reliable way to update the map information stored locally at each autonomous vehicle of the fleet in real time. Each autonomous vehicle may receive the information and incorporate it into that autonomous vehicle's local version of the map information.

For instance, as noted above, the blockage data may identify a polygon or nodes and/or edges of the roadgraph for a blockage. In this regard, certain edges of the roadgraph within the specific area of a blockage (e.g., within the polygon or identified in the blockage data) may be assigned higher costs to traverse or may be designated as nodes and/or edges which are closed to travel by the autonomous vehicles. For example, for a particular blockage, the cost of any edges within the specific area (or specifically identified edges) may be increased to "1000" whereas the typical cost may only be "10". Of course, different cost values may be used. The routing and planning systems of an autonomous vehicle may always use the most recently updated costs in the local map information. In this regard, the autonomous vehicles may be automatically able to avoid the specific areas associated with the blockages while still traveling within such areas when necessary (e.g., because following an alternative route or trajectory would result in even higher costs).

For example, in each of the example blockages of FIGS. 11-16, blockage data or information identifying the nodes and or edges with the areas of the various blockages may be sent to autonomous vehicles of the fleet, including autonomous vehicle 100, by the server computing devices 410. The server computing devices 410 may also provide instructions to enable the autonomous vehicles to increase the costs of traversing the edges (or the edges between identified nodes) or to designate such nodes and/or edges as closed to travel by the autonomous vehicles in the map information stored locally at each autonomous vehicle. In this regard, the autonomous vehicles may be automatically able to avoid the specific areas associated with these edges and thereby associated with these blockages.

As noted above, each set of rules may also be associated with a blockage time. This blockage time may define how long a particular blockage is to persist in an autonomous vehicle's local map information. For example, for construction zone blockages, potential construction zone blockages, or volume blockages, the blockage time may be 30 minutes or more or less. This may be especially useful for construction zones which may only be temporary (i.e., just a few hours of work) or which were false positive detections by the onboard systems of an autonomous vehicle. In the example of a cul-de-sac blockage, the blockage may be automatically removed after some period of time has passed. For example, if the blockage was created after 5 autonomous vehicles entered the cul-de-sac within the last 12 hours, the blockage time may be 12 hours or more or less. Thereafter, the blockage may be removed from the map information at the autonomous vehicle. In other instances, such as stranding or disengaging blockages, the blockage time may be infinite or persistent such that the blockage will not be removed until the autonomous vehicle receives an update from the server computing devices 410. In this regard, the server computing devices 410 may provide a blockage time with each new blockage.

In some instances, in addition to the various sets of rules for different types of blockages, the server computing devices 410 may look for anomalies, such as sudden increases in certain behaviors which may not necessarily meet the aforementioned set of rules but may suggest that a blockage may is needed. For example, if the server computing devices 410 identify a statistical, clustering, or probabilistic increase in instances of strandings, disengages or fallback states reported within a particular geographic area or otherwise proximate to one another, this may be used by the server computing devices to determine that a blockage is needed even if the set of rules for a stranding, disengage or fallback blockage has not actually been met. In some instances, the geographic area may correspond to a threshold distance such as 50 meter or more or less radius.

For the statistical example, if the number of instances of strandings, disengages or fallback states reported within such a threshold distance increases rapidly or increases at least a threshold amount within a short period of time (e.g., a predetermined window), this may be used by the server computing devices to determine that a blockage is needed.

For the clustering example, the server computing devices 410 may use one or more clustering approaches to determine whether a blockage is needed. For example, the server computing devices 410 may utilize approaches such as the Ordering points to identify the clustering structure (OPTICS) algorithm.

For the probabilistic example, one or more anomaly detection algorithms may be used. For instance, such anomaly detection algorithms may include a standard score approach, local outlier factor approach, or any such similar approaches. Historical data about the circumstances (e.g., locations, dates, times, etc.) of strandings and disengages for the autonomous vehicles of the fleet at different locations may be stored by the server computing devices 410 (e.g., in the storage system 450). The anomaly detection algorithms may be applied to the historical data in combination with or without the clustering described above.

In such instances, the server computing devices may automatically generate a blockage for the geographic area while at the same time flagging the geographic area of the blockage in the map information stored by the server computing devices (e.g., in the storage system 450) for further review by a human operator. This enables the system to both react to anomalies quickly and thereby prevent unnecessary future stranding, disengages, etc. in the geographic area while also enabling human operators to further investigate the anomaly (e.g., the strandings, disengages, etc. and/or the geographic area itself.

In other instances, the server computing devices 410 may compare information received from the autonomous vehicles to information generated by the server computing devices in order to determine whether a certain geographic area may be flagged for review, for instance by a human operator who may then determine whether a blockage should be generated. In one example, the server computing devices 410 may compare estimated times of arrival generated by the routing systems of the autonomous vehicles to estimated times of arrival generated by the server computing devices. For example, the server computing devices 410 may use a local version of the routing systems used by the autonomous vehicles or third party products such as GOOGLE MAPS estimated times of arrival which may be determined using the current location of the autonomous vehicle and the destination of that autonomous vehicle (e.g., for a particular trip). For example, if the server computing devices 410 estimate a time of arrival for an autonomous vehicle to a destination location to be 25 minutes, while the routing system of the autonomous vehicle estimates a time of arrival of 30 minutes, a ratio of these may be determined. For example, 30 minutes/25 minutes results in a ratio of a value of 1.2. The server computing devices 410 may determine that the set of rules has been met and a blockage is needed if the ratio from multiple autonomous vehicles within the same geographic area increases rapidly or increases at least a threshold amount within a short period of time (e.g., a predetermined window). In some instances, the geographic area may correspond to a threshold distance such as 50 meter or more or less radius. This may indicate that there is some issue with the routing systems of the autonomous vehicles which can be flagged for further review by human operators, for example, by generating and transmitting a notification to another computing system for display, for example, on display 444 of computing device 440.

In other examples, in addition to using reports from the autonomous vehicles, the server computing devices 410 may use simulation data to determine whether a blockage is needed. For example, the server computing devices 410 may continuously run simulations to determine an anticipated difficulty of lane changes, merges, intersections, etc. at a certain location or rather, a difficulty value indicative of the difficulty of such maneuvers at that location. For example, a difficulty value may be a normalized value on a particular scale such as 0 to 1, where 1 is most difficult, or rather most costly (e.g., in terms of time) or likely to result in a stranding or disengaging). For instance, the server computing devices 410 may run simulations for certain geographic areas such as an intersection. Rather than driving the autonomous vehicles of the fleet through the intersection (e.g., making different types of turns or not turning) numerous times to assess a difficulty value, simulations can be used to assess difficulty values under various conditions (e.g., rain, snow, heavy traffic, no traffic, heavy pedestrian traffic, etc.). The difficulty value may be associated with the intersection such that if the likelihood of stranding or disengaging or the number of actual strandings exceed the difficulty value for the intersection, the intersection (or other geographic area) may be flagged for review by a human operator, for example, by generating and transmitting a notification to another computing system for display, for example, on display 444 of computing device 440.

In some instances, the server computing devices 410 may provide an update to the autonomous vehicles of the fleet to remove a blockage (e.g. the blockage data for a blockage) once certain conditions for the blockage have been met. For instance, blockage data may be removed from the local version of the map information for the autonomous vehicle 100. For example, in each of the example blockages of FIGS. 11-16, information identifying the nodes and or edges with the areas of the various blockages may be sent to autonomous vehicles of the fleet, including autonomous vehicle 100, by the server computing devices 410 via the network 460. The server computing devices 410 may also provide instructions to enable the autonomous vehicles to reduce the costs of traversing the edges (or the edges between identified nodes) or designate such nodes and/or edges as open to travel by the autonomous vehicles in the map information stored locally at each autonomous vehicle. In this regard, the autonomous vehicles may be automatically able to avoid the specific areas associated with these edges and thereby associated with these blockages.

For example, autonomous vehicles of the fleet or human drivers may be sent to observe the locations of blockages. In this regard, at the time blockage data for a blockage is generated by the server computing devices 410, the server computing devices 410 may generate one or more notifications for a human operator identifying portions of the map information included in a blockage. In some instances, these notifications may request the human operator to observe the area of the blockage in order to update aspects of (e.g., size, shape, blockage time or other characteristics) or completely remove the blockage from the map information. Once removed by a human operator, the server computing devices 410 may send a corresponding update to all or some of the autonomous vehicles of the fleet.

In some instances, the updates may be based on updated information received from the autonomous vehicles of the fleet. For example if a minimum number of vehicles reports a change in a specific area of a blockage the server computing devices 410 may determine whether to remove that blockage from the map information. In this regard, similar to the sets of rules for generating different types of blockages, all or some types of blockage (such as those with sets of rules associated with a persistent blockage time) may be associated with a set of rules for removing a blockage of that type. Each set of rules may be associated with, for example, a minimum number of autonomous vehicles reporting information that meets the rules of the set of rules for removing a blockage. In some instances, sets of rules may be associated with a timing constraint for meeting the set of rules. If the set of rules and timing constraints for a blockage of the given type are met by the minimum number of autonomous vehicles for that blockage, the server computing devices 410 may remove the blockage from the map information and send an update to autonomous vehicles of the fleet.

As an example, one set of rules may correspond to removing construction zone blockages. This set of rules may be associated with a minimum number of autonomous vehicles being at least three, four, five or more. The set of rules may include that an area of the blockage was observed by the perception system of an autonomous vehicle, the autonomous vehicle did not detect a construction zone overlapping with the area of the blockage, and there are no relevant construction zone objects (e.g., cones or fences). In addition, the timing constraint may include a sliding window of some fixed period of time such as the last 4 hours or more or less evaluated every 15, 30 or more or less minutes.

The features described herein may provide a centralized system that is able to control where autonomous vehicles of a fleet are able to drive in real time. For example, the features may allow for a fleet management system to automatically and without human intervention prevent autonomous vehicles of a fleet from driving in certain areas without the need for humans to first confirm the blockage or to notify specific vehicles. In other words, the approaches described herein may improve the overall quality of driving for a fleet of autonomous vehicles without necessarily requiring any specific, centralized decision-making. By generating blockage and implementing blockages automatically, autonomous vehicles of the fleet can immediately start avoiding particular lanes and there is no need to do any intelligence gathering before implementing a blockage. Moreover, the features described herein provide for a system where the map information at each autonomous vehicle is as consistent as possible across the fleet. In many instances, adding blockages to the map information used by the autonomous vehicle may reduce the numbers of strandings and disengagements, reduce traffic congestion caused by slow moving or stopped (e.g., stranded) autonomous vehicles through certain areas, and may also improve navigation quality. As such, the features described herein may also improve the experience of passengers of these autonomous vehicles. Moreover, the more autonomous vehicles providing information, the more useful and up to date the blockages may be.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of generating blockages in map information for use by a fleet of autonomous vehicles, the method comprising:

receiving, by one or more processors of a server computing system, information, from an autonomous vehicle of the fleet, indicating that an autonomous driving mode of the autonomous vehicle has been disengaged in a particular geographic area or that the autonomous vehicle has become stranded in the particular geographic area;

determining, by the one or more processors based on the received information, that at least a minimum number of instances of disengagement or stranding associated with the fleet have occurred within the particular geographic area;

in response to the determination, generating, by the one or more processors, blockage data identifying a specific area of a blockage, the specific area including the particular geographic area; and sending, by the one or more processors, the blockage data to the autonomous vehicles of the fleet to enable respective autonomous control of the autonomous vehicles of the fleet to avoid driving in the specific area of the blockage to prevent future disengagements of the autonomous driving mode or strandings in the particular geographic area.

2. The method of claim 1, wherein the received information indicates that the autonomous vehicle has disengaged from the autonomous driving mode in the particular geographic area.

3. The method of claim 1, wherein the received information indicates that the autonomous vehicle has become stranded in the particular geographic area.

4. The method of claim 1, further comprising determining that at least the minimum number of instances of disengagement or stranding associated with the fleet have occurred within the particular geographic area satisfies a timing constraint.

5. The method of claim 1, further comprising:

receiving, by the one or more processors, updated information from another autonomous vehicle of the fleet;

in response to the received updated information, determining, by the one or more processors, that at least a minimum number of autonomous vehicles of the fleet have provided the updated information within a timing constraint; and based on the determination that at least the minimum number of autonomous vehicles of the fleet have provided the updated information within the timing constraint, sending an instruction to the autonomous vehicles of the fleet to remove the blockage from map information stored locally at the autonomous vehicles of the fleet.

6. The method of claim 1, further comprising:

receiving, by the one or more processors, other information from another autonomous vehicle of the fleet;

determining, by the one or more processors, that the received other information does not meet any of a set of rules for generating blockages;

determining, by the one or more processors, that another blockage is needed based on the other information and an increase in a number of disengagement or stranding instances associated with the fleet;

in response to determining that the other blockage is needed, generating, by the one or more processors, other blockage data identifying another specific area of the other blockage; and sending, by the one or more processors, the other blockage data to the autonomous vehicles of the fleet in order to enable the autonomous vehicles of the fleet to avoid the other specific area of the other blockage.

7. The method of claim 6, further comprising using a probabilistic approach to determine the increase in the number of disengagement or stranding instances associated with the fleet.

8. A method of generating blockages in map information for use by a fleet of autonomous vehicles, the method comprising:

receiving, by one or more processors of a server computing system, information from an autonomous vehicle of the fleet indicating that the autonomous vehicle is within a particular geographic area;

determining, by the one or more processors based on the received information, that the particular geographic area has been traversed by at least a minimum number of autonomous vehicles of the fleet within a timing constraint;

based on the determination that the particular geographic area has been traversed by at least the minimum number of autonomous vehicles of the fleet within the timing constraint, generating, by the one or more processors, blockage data identifying a specific area of a blockage including the particular geographic area; and sending, by the one or more processors, the blockage data to the autonomous vehicles of the fleet to enable respective autonomous control of the autonomous vehicles of the fleet to avoid driving in the specific area of the blockage in order to reduce traffic congestion within the particular geographic area.

9. The method of claim 8, wherein the particular geographic area is a cul-de-sac.

10. The method of claim 8, further comprising:

receiving, by the one or more processors, updated information from another autonomous vehicle of the fleet;

in response to receiving the updated information, determining, by the one or more processors, at least another minimum number of autonomous vehicles have provided the updated information within another timing constraint; and based on the determination that at least the other minimum number of autonomous vehicles have provided the updated information within the other timing constraint, sending an instruction to the autonomous vehicles of the fleet to remove the blockage from map information stored locally at the autonomous vehicles of the fleet.

11. A method of generating blockages in map information for use by a fleet of autonomous vehicles, the method comprising:

receiving, by one or more processors of a server computing system, information from an autonomous vehicle indicating that the autonomous vehicle has reported entering a fallback state based on occurrence of an error situation within a geographic area;

determining, by the one or more processors, that the geographic area has met at least one set of rules for generating blockages including a minimum number of autonomous vehicles of the fleet entering the fallback state based on occurrence of the error situation within the geographic area based on the received information indicating that the autonomous vehicle has reported entering the fallback state based on occurrence of the error situation within the geographic area;

based on the determination that the received information meets the at least one set of rules for generating blockages, generating, by the one or more processors, blockage data identifying a specific area of a blockage including the geographic area; and sending, by the one or more processors, the blockage data to autonomous vehicles of the fleet to enable autonomous control of the autonomous vehicles of the fleet such that the autonomous vehicles of the fleet avoid driving in the specific area of the blockage including the geographic area.

12. The method of claim 11, wherein determining that the geographic area has met the at least one set of rules includes determining that the minimum number of autonomous vehicles of the fleet entering the fallback state based on occurrence of the error situation satisfies a timing constraint.

13. The method of claim 11, further comprising:

receiving, by the one or more processors, updated information from a second autonomous vehicle of the fleet;

in response to receiving the updated information, determining, by the one or more processors, that the geographic area has met a second set of rules for removing the blockage including a minimum number of autonomous vehicles providing the updated information; and based on the determination that the second set of rules has been met, sending a second instruction to the autonomous vehicles of the fleet to remove the blockage from map information stored locally at the autonomous vehicles of the fleet.

14. The method of claim 13, wherein the second set of rules is associated with a timing constraint for the minimum number of autonomous vehicles providing the updated information.

* * * * *